US011213953B2

(12) United States Patent
Lee et al.

(10) Patent No.: US 11,213,953 B2
(45) Date of Patent: Jan. 4, 2022

(54) EFFICIENT ROBOT CONTROL BASED ON INPUTS FROM REMOTE CLIENT DEVICES

(71) Applicant: Google LLC, Mountain View, CA (US)

(72) Inventors: Johnny Lee, Mountain View, CA (US); Stefan Welker, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 221 days.

(21) Appl. No.: 16/523,655

(22) Filed: Jul. 26, 2019

(65) Prior Publication Data

US 2021/0023711 A1 Jan. 28, 2021

(51) Int. Cl.
*B25J 9/16* (2006.01)
(52) U.S. Cl.
CPC .............. *B25J 9/1689* (2013.01); *B25J 9/163* (2013.01); *B25J 9/1697* (2013.01); *B25J 9/1612* (2013.01)
(58) Field of Classification Search
None
See application file for complete search history.

(56) References Cited

U.S. PATENT DOCUMENTS 9,649,767 B2 * 5/2017 Nusser ................... B25J 9/1679
9,802,317 B1 * 10/2017 Watts ..................... B25J 9/1687
10,131,051 B1 * 11/2018 Goyal .................... B25J 9/1697
10,766,137 B1 * 9/2020 Porter ..................... B25J 9/161
2013/0329954 A1 * 12/2013 Ikeda .................. B23Q 17/2414
382/103
2013/0346348 A1 * 12/2013 Buehler ............... G05B 19/423
706/12

(Continued)

FOREIGN PATENT DOCUMENTS

EP 1522911 4/2005

OTHER PUBLICATIONS

Leeper et al. "Strategies for Human-in-the-Loop Robotic Grasping." In Proceedings of the seventh annual ACM/IEEE international conference on Human-Robot Interaction, pp. 1-8; Mar. 5, 2012.

(Continued)

*Primary Examiner* — Robert T Nguyen
*Assistant Examiner* — Dylan M Katz
(74) *Attorney, Agent, or Firm* — Middleton Reutlinger

(57) ABSTRACT

Utilization of user interface inputs, from remote client devices, in controlling robot(s) in an environment. Implementations relate to generating training instances based on object manipulation parameters, defined by instances of user interface input(s), and training machine learning model(s) to predict the object manipulation parameter(s). Those implementations can subsequently utilize the trained machine learning model(s) to reduce a quantity of instances that input(s) from remote client device(s) are solicited in performing a given set of robotic manipulations and/or to reduce the extent of input(s) from remote client device(s) in performing a given set of robotic operations. Implementations are additionally or alternatively related to mitigating idle time of robot(s) through the utilization of vision data that captures object(s), to be manipulated by a robot, prior to the object(s) being transported to a robot workspace within which the robot can reach and manipulate the object.

21 Claims, 13 Drawing Sheets

(56) References Cited

U.S. PATENT DOCUMENTS

2019/0130560 A1    5/2019  Horowitz et al.
2019/0270197 A1*  9/2019  Wagner .................. B25J 9/1669
2019/0321984 A1*  10/2019  Yamazaki ............. B25J 9/1612
2021/0188554 A1*  6/2021  Kalouche ............... B25J 9/0093

OTHER PUBLICATIONS

European Patent Office; International Search Report and Written Opinion of PCT Ser. No. PCT/US2020/43502; 22 pages; dated Nov. 9, 2020.

* cited by examiner

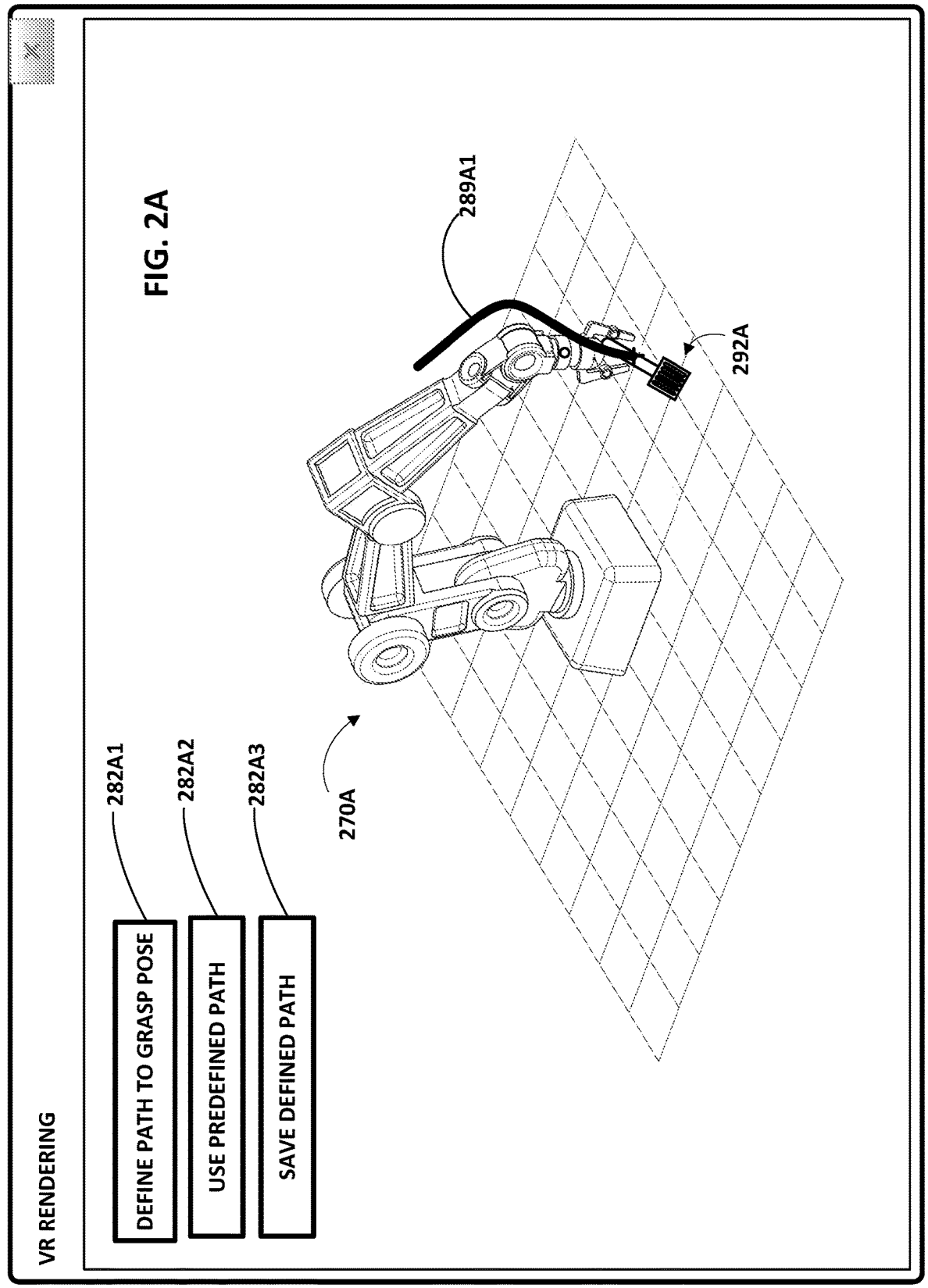

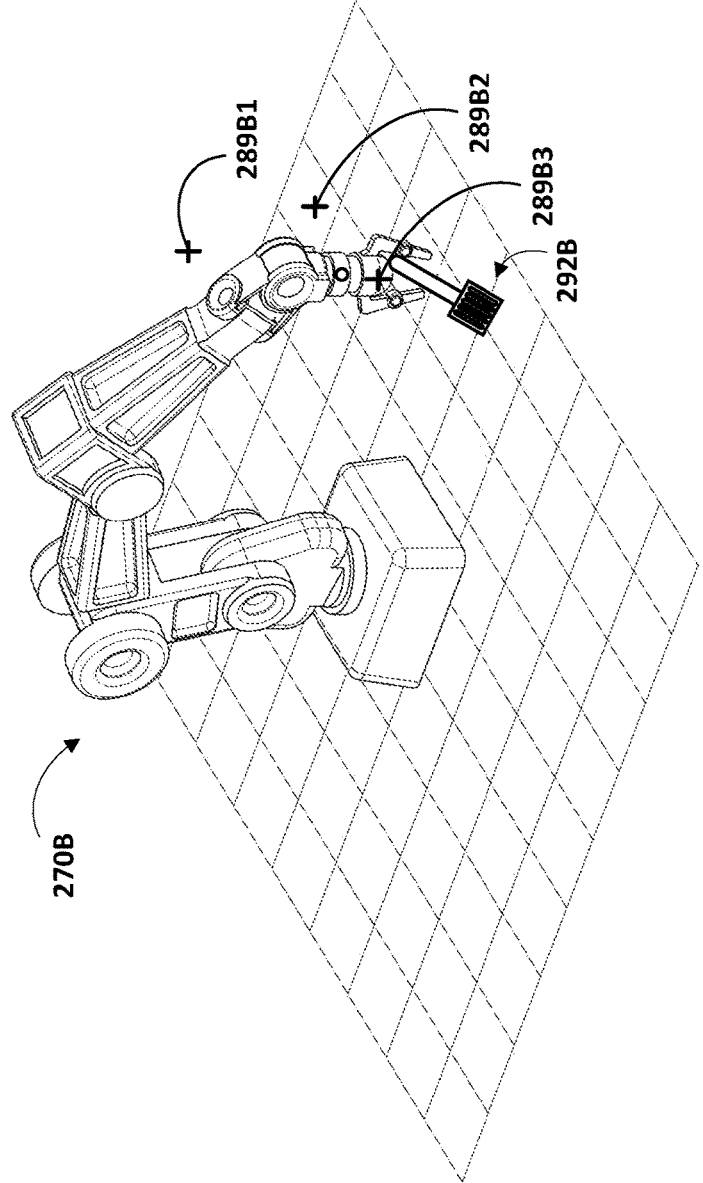

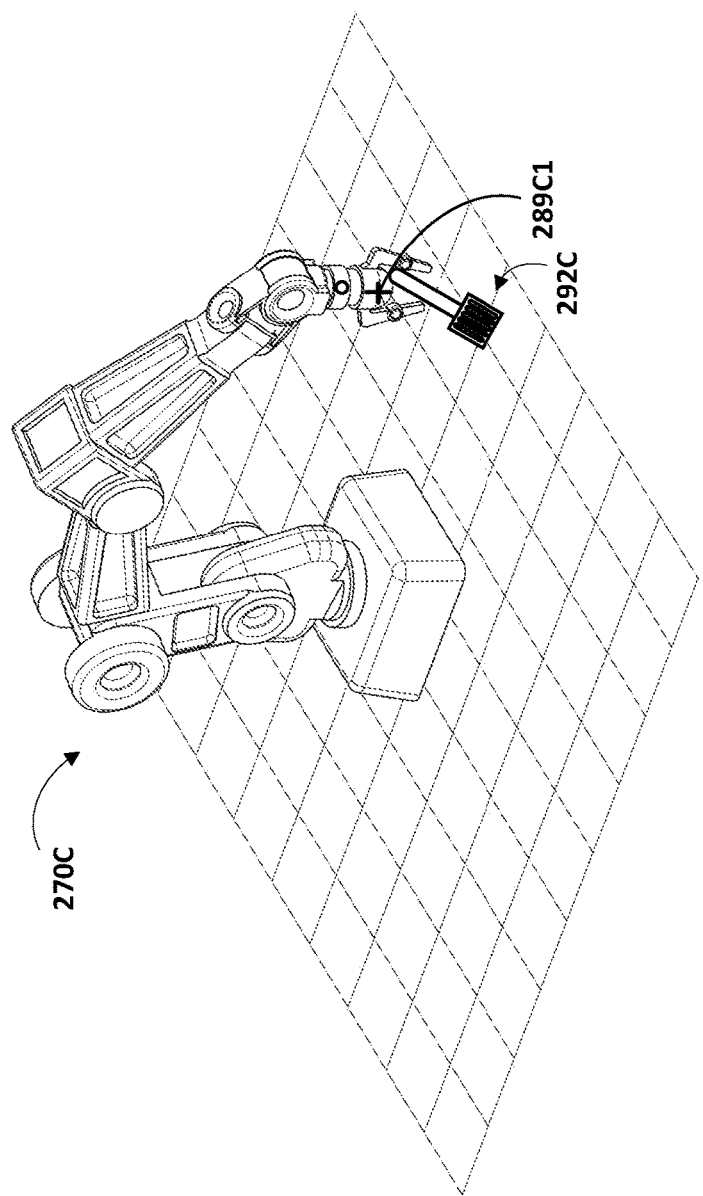

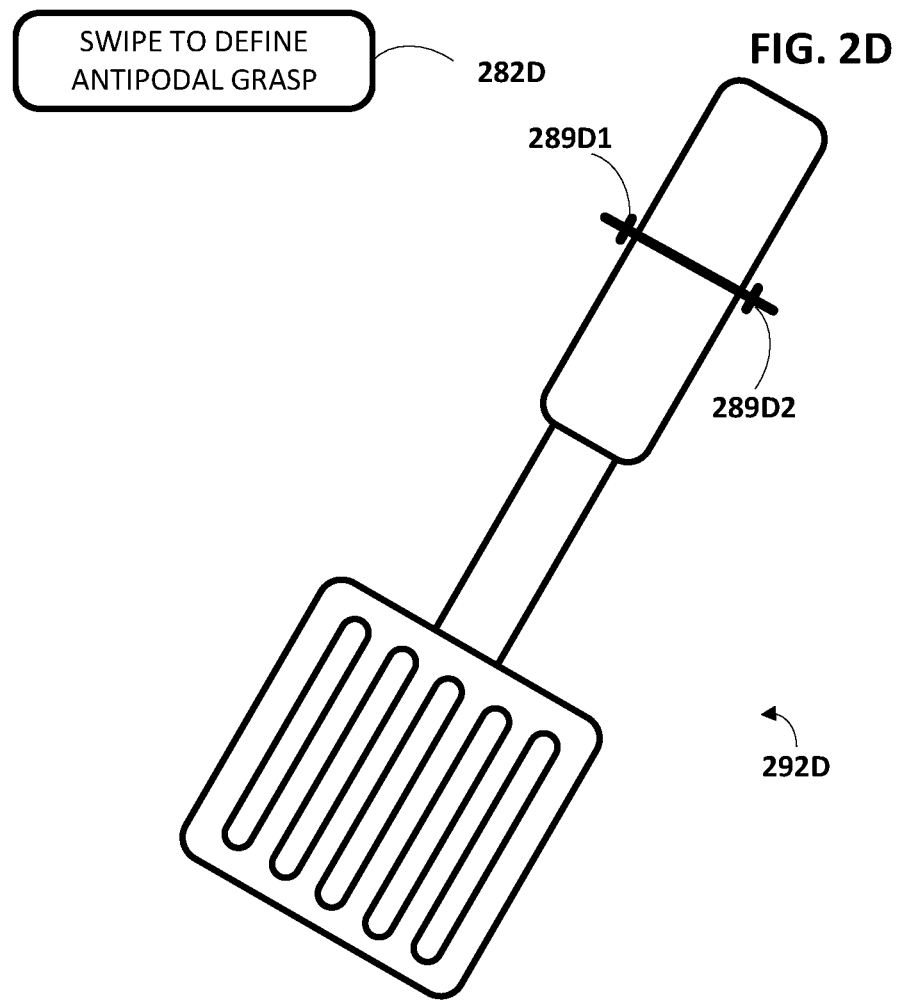

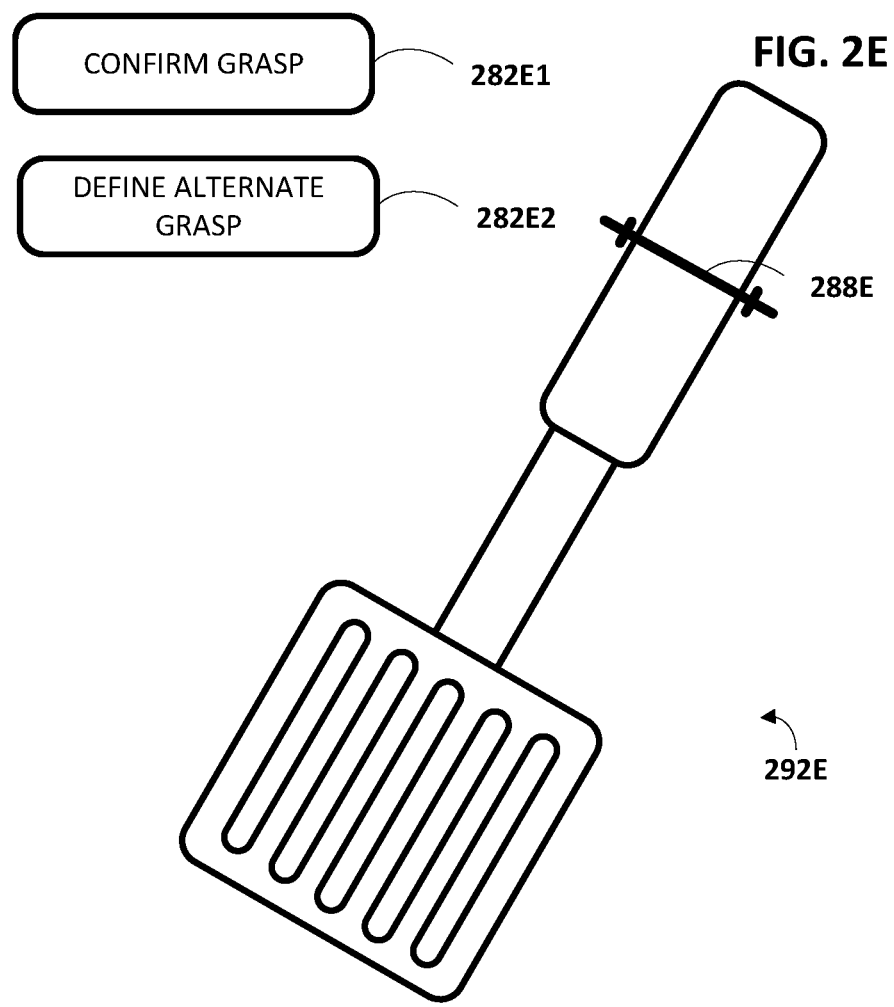

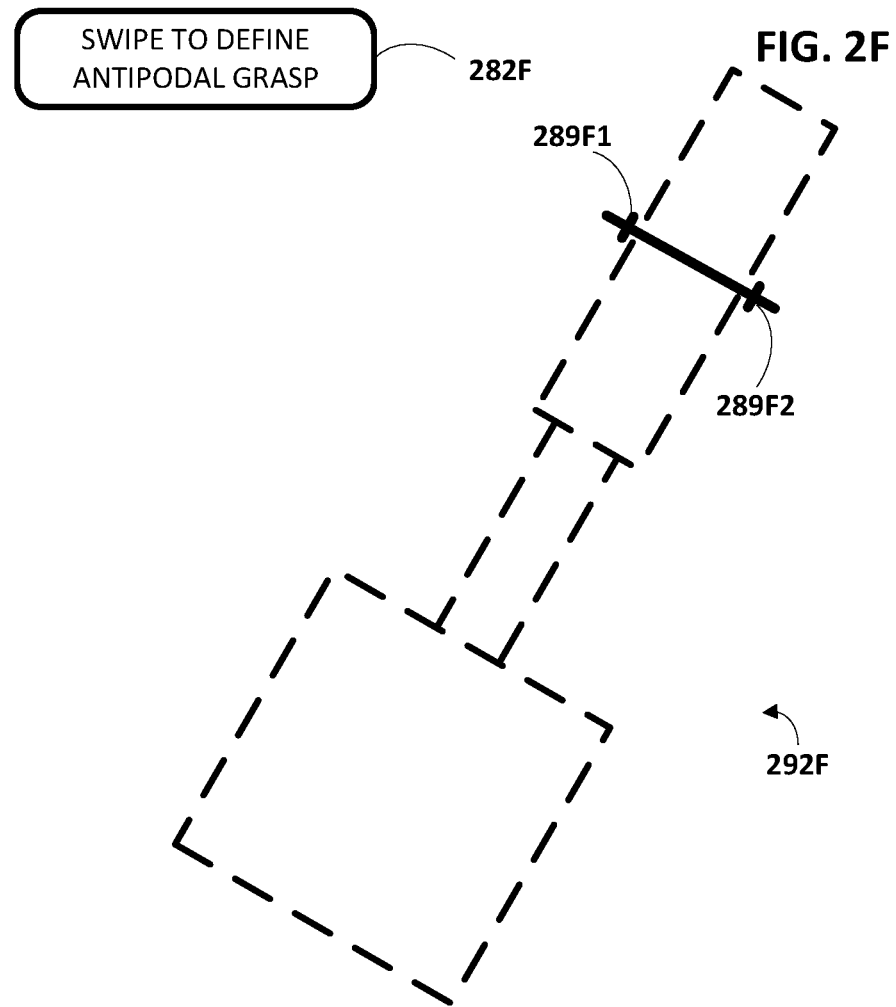

EFFICIENT ROBOT CONTROL BASED ON INPUTS FROM REMOTE CLIENT DEVICES

BACKGROUND

In industrial or commercial settings, a robot is often pre-programmed to repeatedly perform a particular task. For example, a robot can be pre-programmed to repeatedly apply fasteners to particular assembly component(s) in an assembly line. Also, for example, a robot can be pre-programmed to repeatedly grasp and move particular assembly component(s) from a fixed first location to a fixed second location. In grasping object(s), a robot can use a grasping end effector such as an "impactive" end effector (e.g., applying force to areas of the object(s) using "claws", or other digits), an "ingressive" end effector (e.g., physically penetrating object(s) using pins, needles, etc.), an "astrictive" end effector (e.g., using suction or vacuum to pick up object(s)), and/or one or more "contigutive" end effectors (e.g., using surface tension, freezing, or adhesive to pick up object(s)).

Such approaches can work well in environments where constrained actions are repeatedly performed on a constrained group of component(s). However, such approaches can fail in environments where a robot is tasked with performing a large variety of actions and/or performing action(s) on a diverse group of components, optionally including new component(s) for which the robots have not been pre-programmed. Moreover, such approaches require significant engineering effort (and associated usage of computational resources) in pre-programming the robot. Further, to accommodate the robots in the environment, such approaches can require significant reconfiguring of an industrial or commercial environment. Separately, some human in the loop approaches have been proposed where humans repeatedly provide the same type of guidance for assisting a robot in performance of a task. However, such approaches can suffer from various drawbacks. For example, some approaches can result in robots being idle while soliciting and/or awaiting human guidance, which results in inefficient operation of the robots. Also, for example, some approaches always solicit human guidance and/or the same type of guidance. This limits the ability of the robotic operation to operate more efficiently and/or the ability of the humans to increase their productivity.

SUMMARY

Implementations disclosed herein relate to utilization of user interface inputs, from remote client devices, in controlling robot(s) in an environment. An instance of user interface input(s), provided at a remote client device, indicates (directly or indirectly) one or more object manipulation parameter(s) to be used by a robot in manipulating at least one object. For example, the object manipulation parameter(s) indicated by an instance of user interface input(s) can include: a grasp pose; a placement pose; a sequence of waypoint(s) to encounter in traversing to a grasp pose; a sequence of waypoints to encounter in traversing toward a placement pose (after grasping the object); a full path or trajectory (i.e., a path with velocity, acceleration, jerk, and/or other parameter(s)) in traversing to and/or from a manipulation pose (e.g., a grasp pose or other manipulation pose); and/or other object manipulation parameter(s) such as, but not limited to, those described in additional detail herein.

The user interface input(s) of an instance are provided with reference to a visual representation that includes an object representation of the at least one object. The visual representation can also optionally include an environmental representation of other environmental objects (e.g., a work surface, a container in which the at least one object is to be placed) and/or a robot representation of all or parts of the robot. The visual representation can be rendered, for example, on a standalone display screen controlled by the remote client device or a virtual reality (VR) headset controlled by the remote client device. The user interface input(s) can be provided, for example, via a mouse, a touchscreen, VR hand controllers, and/or VR gloves. Additional description is provided herein of example visual representations and how can they be rendered, including description of implementations that generate visual representations in a manner that reduces network traffic and/or reduces latency in rendering the visual representations.

Some implementations disclosed herein are directed to generating training instances based on object manipulation parameters that are defined by instances of user interface input(s). Those implementations are further directed to training machine learning model(s), based on the training instances, for use of the trained machine learning models in predicting the object manipulation parameter(s). In some of those implementations, a training instance can be generated and/or labeled as a positive training instance, responsive to determining that a measure of success, of a manipulation attempted based on corresponding object manipulation parameter(s), satisfies a threshold. The measure of success can be generated based on sensor data from one or more sensors, and can be generated in a manner that is dependent on the manipulation being performed. As one example, if the manipulation is a grasp with an impactive end effector, the measure of success can indicate whether the grasp was successful. The measure of success can be based on, for instance, sensor data from sensor(s) of the impactive end effector (e.g., using positions of digit(s), determined based on data from a position sensor and/or torque(s) indicated by torque sensor(s) to determine whether the impactive end effector is grasping the object); vision data from vision sensor(s) of the robot (e.g., to determine whether the impactive end effector is grasping the object and/or whether the object has moved from its prior location), weight sensor(s) in the environment (e.g., to determine whether the object was lifted from a location and/or placed in another location), etc. As another example, if the manipulations include a grasp of an object and a subsequent placement of the object in a container, a measure of success of the placement manipulation can indicate whether the object was successfully placed in the container and/or a degree to which the placement in the container conforms to a desired placement. As yet another example, if the manipulations includes the joining of two objects, a measure of success of the placement manipulation can indicate whether the objects were successfully joined together and/or a degree of accuracy of their joinder.

Implementations that train machine learning model(s) based on the generated training instances, are further directed to subsequently utilizing the trained machine learning model(s). Utilizing the trained machine learning model(s) reduces a quantity of instances that input(s), from remote client device(s), are solicited in performing a given set of robotic manipulations (thereby reducing network traffic) and/or reduces the extent of input(s) from remote client device(s) in performing a given set of robotic operations (thereby providing efficient resource utilization at the remote client device(s)). Those implementations can enable the robot(s) in an environment to operate more efficiently by reducing instances of and/or durations of the robot(s) sitting idle while awaiting user interface input(s). Those implementations can additionally increase productivity of an operator of a remote client device, by enabling the operator to provide input(s) for a greater quantity of manipulations and/or for a greater quantity of robots.

As one particular example, assume one or more robots are newly deployed in a given environment for performing manipulations that each include grasping a corresponding object from a conveyor belt and placing the object in an appropriate one of N available containers (e.g., shipping boxes). At first, user interface input(s) can be solicited, for each manipulation, to determine object manipulation parameters that include: a sequence of waypoint(s) to encounter in traversing to a grasp pose for grasping the object; the grasp pose; a sequence of waypoints to encounter in traversing toward an appropriate one of the N available containers; and a placement pose for placing the object in the container. Those determined manipulation parameters can be utilized to control the robot(s) in performing the manipulations.

Over time, training instances can be generated, for each of one or more machine learning models, based on corresponding vision data (and/or other sensor data), one or more of the object manipulation parameters, and optionally based on measures of success. Each of the machine learning models can be trained for processing vision data and/or other sensor data, in predicting one or more corresponding manipulation parameter(s). Further, the machine learning model(s) can be trained based on the training instances. For example, assume a machine learning model trained for use in processing vision data to generate a corresponding probability for each of N grasp poses. Positive training instances can be generated based on corresponding vision data and a corresponding grasp pose defined by user interface input, for manipulations that included a successful grasp (as determined based on a measure of success for the grasp).

A trained machine learning model can then be at least selectively utilized in predicting one or more corresponding object manipulation parameters that are then at least selectively utilized in controlling the robot(s). For example, a predicted object manipulation parameter can be automatically utilized (without prompting for confirmatory user interface input) and/or can be utilized after presenting an indication of the predicted object manipulation parameter (e.g., as part of a visual representation) and receiving confirmatory user interface input in response. In these and other manners, an object manipulation parameter can be determined and utilized without requiring user interface input (e.g., when it is automatically utilized) and/or with a reduced amount of user interface input (e.g., when confirmatory user interface input is provided in lieu of more time consuming full input to define the object manipulation parameter). This can reduce a duration of time needed to determine object manipulation parameters, enabling robots and/or remote operators to operate more efficiently.

In some implementations, a trained machine learning model is only utilized, in predicting object manipulation parameters that are at least selectively utilized, after determining one or more conditions are satisfied. The one or more conditions can include, for example, at least a threshold amount of training and/or validation of the trained machine learning model. Validation of the trained machine learning model can include comparing predictions, generated using the machine learning model, to ground truth object manipulation parameters that are based on user interface input— optionally for instances of vision data (and/or other sensor data) on which the machine learning model has not been trained. In various implementations, and as described herein, a trained machine learning model can continue to be trained even after it is actively utilized in predicting object manipulation parameters that are at least selectively utilized in operations of a robot. For example, additional training instances can be generated based on predicted and utilized object manipulation parameters, and labeled as positive or negative based on determined measures of success. Also, for example, additional training instances can be generated based on predicted object manipulation parameters, and labeled as negative if user interface input rejected the predicted object manipulation parameters.

As one particular example, assume again the machine learning model trained for use in processing vision data to generate a corresponding probability for each of N grasp poses. When vision data is processed, using the trained machine learning model, that results in a probability for a corresponding grasp pose that exceeds a first threshold (e.g., 85% or other threshold), the grasp pose can be utilized automatically and without prompting for confirmatory user interface input. If no grasp pose exceeds the first threshold, but the probability for grasp pose(s) do exceed a second threshold (e.g., 50% or other threshold), indication(s) of one or more of those grasp pose(s) can be presented, along with an object representation in the visual representation, and one utilized only if confirmatory input is directed to that grasp pose. If no grasp pose exceeds the first threshold or the second threshold, then user interface input can be solicited for determining the grasp pose, without providing any indication of the predicted grasp poses(s). The grasp pose determined based on the user interface input can then be utilized in generating a training instance, optionally also considering a measure of success of the grasp. The training instance can then be utilized to further train the model. It is noted that such a training instance is a "hard negative" training instance, that can be particularly beneficial in efficiently updating parameters of the machine learning model to increase accuracy and/or robustness of the model.

Accordingly, for a given deployment of robot(s) in an environment, instances of user interface input can initially be utilized to determine object manipulation parameter(s) that are utilized in controlling the robot(s) in performing manipulation(s). Further, training instances can be generated based on the object manipulation parameter(s) determined using the instances of user interface input, and based on corresponding vision data and/or other sensor data, and optionally based on measures of success determined based on sensor data. The training instances can be utilized to train machine learning model(s) for utilization in predicting the object manipulation parameter(s). In response to satisfaction of one or more conditions, a trained machine learning model can then be brought "online", and utilized in generating predicted object manipulation parameter(s). The predicted object manipulation parameters are at least selectively automatically utilized in controlling the robot(s) and/or corresponding indications of the predicted object manipulation parameter(s) are rendered on remote client device(s), and utilized if confirmatory user interface input is received in response. Further, even after being brought online, the trained machine learning model can continue to be trained, increasing its accuracy and efficiency, thereby increasing the quantity of instances in which predictions can be automatically utilized in controlling the robot(s) and/or rendered as suggestions for confirmatory approval.

In these and other manners, robots can be deployed in a new environment and/or for new tasks, and immediately utilized without requiring significant usage of engineering and/or computational resources prior to deployment. For example, object manipulation parameter(s) utilized initially at deployment can be based heavily (or even exclusively) on user interface input(s) from remote devices. However, over time, the user interface input(s) from remote devices can be utilized to train machine learning model(s) that are brought online to reduce an amount and/or extent of user interface input(s) required in operating the robot(s) in the environment. This enables the robot(s) to operate more efficiently in the environment and reduces an amount of network traffic to remote device(s) for a given amount or robotic manipulations. Further, this enables operator(s) of the remote client device(s) to assist in control of a greater quantity of robotic manipulations, increasing productivity of the operator(s) and enabling increased monetary compensation for the operator(s).

Some implementations disclosed herein are additionally or alternatively directed to particular technique(s) for determining object manipulation parameter(s), for manipulating a given object, based on user interface input(s) from remote operators. Some of those implementations are directed to techniques that mitigate (e.g., reduce or eliminate) idle time of robot(s) while awaiting provisioning of the user interface input(s). Mitigating idle time of robot(s) increases the overall efficiency of the robot operations.

Some implementations seek to mitigate idle time of robots through the utilization of vision data that captures object(s), to be manipulated by a robot, prior to the object(s) being transported to a robot workspace within which the robot can reach and manipulate the object. For example, vision component(s) (e.g., monographic and/or stereographic cameras, Lidar component(s), and/or other vision component(s)) can have a field of view of a first area of an environment that is disparate from the robot workspace. Vision data from the vision components can capture features of an object when it is in the first area prior to that object being transported to the robot workspace. For instance, the first area can be a portion of a conveyor system that transports the objects from the portion to the robot workspace. The vision data capturing the object in the first area can be used to generate a visual representation that includes at least an object representation, of the object, that is generated based on object features of the object captured in the vision data.

Prior to completion of transporting of the object to the robot workspace (e.g., while the object is being transported by the conveyor system, but before its arrival in the robot workspace), the visual representation can be transmitted to a remote client device. Further, data can be received from the remote client device prior to completion of transporting of the object to the robot workspace, where the data is generated based on user interface input directed at the visual representation when rendered at the remote client device.

The received data indicates, directly or indirectly, one or more object manipulation parameters for manipulating the object in the robot workspace. Accordingly, the object manipulation parameters can be determined based on the data, and can optionally be determined prior to completion of transporting of the object to the robot workspace. The determined object manipulation parameters can then be utilized in controlling the robot to cause the robot to manipulate the object when the object is within the robot workspace after it is transported to the robot workspace. Since at least the visual representation is transmitted and the responsive data is received prior to completion of transporting of the object to the robot workspace, the robot can quickly manipulate the object, based on manipulation parameters determined based on the data, once the object is within the robot workspace. For example, the robot can determine, based on vision data from its own vision components, when the object is within the robot workspace, and operate according to the object manipulation parameters responsive to such a determination. The robot can optionally await the object to be at a pose that corresponds to a pose for which the object manipulation parameters are defined, or can transform the object manipulation parameters to a newly detected pose of the object in the robot workspace (e.g., when it varies from that for which the object manipulation parameters were defined). If the robot workspace itself includes a conveyor portion via which the object is transported, that conveyor portion can optionally be temporarily halted while the robot manipulates the object. In other implementations, the object can be transported to the robot workspace using a conveyor or other transportation mean(s) (e.g., an air tube, a separate transportation robot, by a human), and the robot workspace itself may not include a conveyor portion.

Optionally, where trained machine learning model(s) have been brought online for use in predicting object manipulation parameter(s), the vision data from the first area can be utilized in predicting object manipulation parameter(s). This enables object manipulation parameter(s) to be predicted prior to completion of transporting of the object to the robot workspace. The predicted object manipulation parameter(s) can be automatically used as some of the object manipulation parameter(s), and/or indications of the predicted object manipulation parameter(s) can be provided with the visual representation—and one or more of the predicted object manipulation parameter(s) utilized if the received data indicates confirmation of the predicted object manipulation parameter(s).

In some implementations, poses(s) of the vision component(s) in the first area and pose(s) of the robot vision component(s) are known, enabling determination of a transformation between a reference frame of the vision component(s) in the first area and a robot frame of the robot vision component(s). Using this transformation enables the inputs at the remote client device to be defined directly in the robot frame, or to be defined initially in the first frame and then transformed to the robot frame.

In some implementations, the visual representation transmitted to the remote client device includes an object representation of the object and optionally one or more object representation(s) of other nearby dynamic object(s) (dynamic in the first area), but omits other portion(s) of the first area that are static. In some of those implementations, only representations of the object and optionally nearby dynamic objects are rendered at the remote client device. In some other implementations, all or portions of the robot and/or robot workspace are also rendered at the remote client device (despite not being captured in the vision data that captures the first area). For example, the remote client device can execute a robotic simulator, or be in communication with an additional device executing the robotic simulator. The robotic simulator can simulate all or parts of the robot and/or all or parts of the robot workspace, and can render a simulation of the object along with the robot simulation and/or robot workspace simulation. The pose of the object relative to the robot simulation and/or robot workspace simulation can be determined using the aforementioned transformation. This can enable a human operator to provide user interface input(s) that manipulate the robot simulation to define object manipulation parameter(s). For example, to define a grasp pose a human operator can provide user interface input(s) that adjust the robot simulation until it is in a desired pose, then provide further user interface input(s) to define that desired pose as the grasp pose.

Implementations that simulate the robot and/or robot workspace enable smaller data size visual representations to be transmitted from the environment to remote client device(s). This can be a result of those transmissions defining only dynamic object(s), not defining static features of the robot workspace, and/or not defining features of the robot. In addition to conserving network resources, this can mitigate delay in rendering the visual representation at the remote device, as the smaller data size can be transmitted more quickly to the remote client device and/or rendered more quickly at the remote client device. This mitigating of delay can likewise mitigate idle time of robots. Moreover, it is noted that even in implementations where an object representation is generated based on robot vision data (in lieu of vision data from a disparate area), simulating the robot and/or robot workspace can still enable smaller data size visual representations to be transmitted—and mitigate idle time of robots.

Some implementations additionally or alternatively seek to mitigate idle time of robots through generating object representations, of visual representations to be rendered at a client device, that render objects with less accuracy than full representations, but are a smaller data size than full representations. For example, an object can be represented by one or more bounding boxes and/or other bounding shapes that approximate surfaces of the objects. For instance, an object can be defined by a plurality of connected bounding boxes, each of which can be defined by a center point, a height dimension, and a width dimension—which comprises significantly less data than a representation that defines color, texture, and/or depth for each pixel or voxel that corresponds to a surface of the object. In addition to conserving network resources, the less accurate object representations can mitigate delay in rendering the visual representation at the remote device, as the smaller data size can be transmitted more quickly at the remote client device and/or rendered more quickly at the remote client device. Moreover, the less accurate object representations can obfuscate or remove potentially sensitive data from object(s), or obfuscate the objects themselves, preventing operators of remote devices from ascertaining the data and/or objects.

Although some examples are described herein with reference to manipulations that include grasping and/or placing objects, it is understood that techniques described herein can be utilized for a variety of robotic manipulations on objects. For example, techniques can be utilized for a manipulation that includes pushing and/or pulling an object to move it to a different location and/or to mate it with another object. Also, for example, techniques can be utilized for a manipulation that includes grasping a first object, grasping a second object, coupling the first and second object together, and placing the coupled object in a particular location. As yet another example, techniques can be utilized for a manipulation that includes operating on an object with an end effector that includes an etching tool, a screwdriver tool, a cutting tool, and/or other tool(s).

The above description is provided as an overview of some implementations of the present disclosure. Further description of those implementations, and other implementations, are described in more detail below.

Other implementations may include a transitory or non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 2A, 2B, 2C, 2D, 2E, and 2F each illustrate an example of rendering, at a remote client device, a visual representation that includes an object representation of an object to be manipulated by a robot, and examples of user interface inputs that can be provided to define and/or confirm object manipulation parameter(s) for manipulation of the object by the robot.

DETAILED DESCRIPTION

Figure 1A:
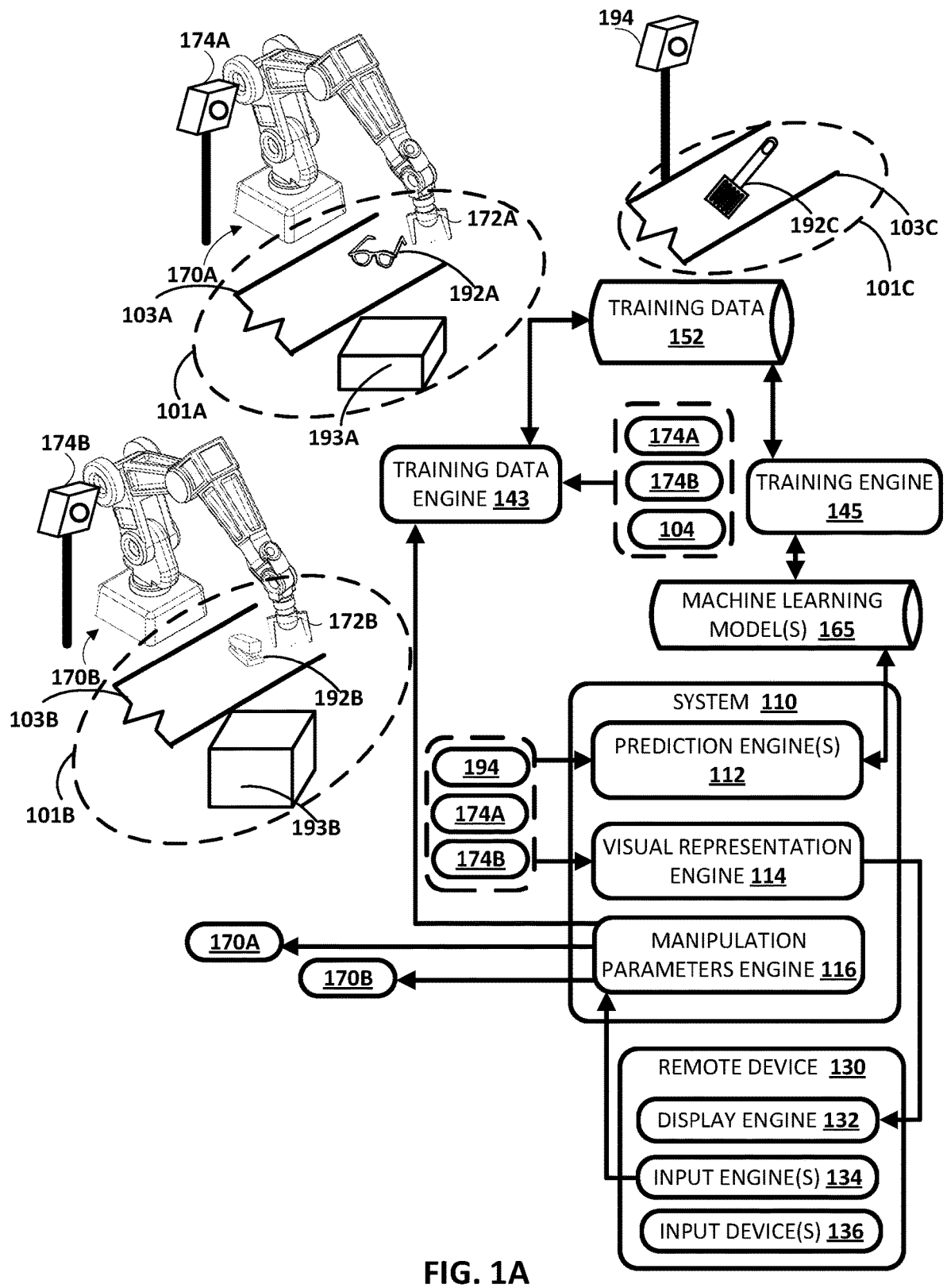
FIG. 1A illustrates an example environment in which implementations described herein can be implemented.

FIG. 1A illustrates an example environment in which implementations described herein can be implemented. FIG. 1A includes a first robot 170A and associated robotic vision component 174A, a second robot 170B and associated robotic vision component 174B, and an additional vision component 194. The additional vision component 194 can be, for example, a monographic camera (e.g., generating 2D RGB images), a stereographic camera (e.g., generating 2.5D RGB images), a laser scanner (e.g., generating 2.5D "point clouds"), and can be operatively connected to one or more systems (e.g., the system 110) disclosed herein. Optionally, multiple additional vision components can be provided and vision data from each utilized as described herein. The robotic vision components 174A and 174B can be, for example, a monographic camera, a stereographic camera, a laser scanner, and/or other vision component—and vision data therefrom can be provided to and utilized by corresponding robots 170A and 170B as described herein. Although illustrated adjacent to the robots 170A and 170B in FIG. 1A, in other implementations robotic vision components 174A and 174B can alternatively be coupled directly to the robots 170A and 170B (e.g., attached near the end effectors 172A and 172B).

The robots 170A and 170B, robotic vision components 174A and 174B, and additional vision component 194 are all deployed in an environment, such as a manufacturing facility, a packaging facility, or other environment. Although the environment can include additional robots and/or additional vision components, only robots 170A and 170B, and additional vision component 194, are illustrated in FIG. 1 for simplicity.

Robots 170A and 170B are each a "robot arm" having multiple degrees of freedom to enable traversal of a corresponding grasping end effector 172A, 172B along any of a plurality of potential paths to position the grasping end effector in desired locations. Robots 170A and 170B each further controls two opposed "claws" of their corresponding grasping end effector 172A, 172B to actuate the claws between at least an open position and a closed position (and/or optionally a plurality of "partially closed" positions). Although particular robots 170A and 170B are illustrated in FIG. 1A, additional and/or alternative robots may be utilized, including additional robot arms that are similar to robots 170A and 170B, robots having other robot arm forms, robots having a humanoid form, robots having an animal form, robots that move via one or more wheels, an unmanned aerial vehicle ("UAV"), and so forth. Also, although particular grasping end effectors 172A and 172B are illustrated in FIG. 1A, additional and/or alternative end effectors may be utilized (or even no end effectors), such as alternative impactive grasping end effectors (e.g., those with grasping "plates", those with more or fewer "digits"/"claws"), "ingressive" grasping end effectors, "astrictive" grasping end effectors, or "contiguity" grasping end effectors, or non-grasping end effectors (e.g., welding tools, cutting tools, etc.). For example, an astrictive end effector with a plurality of suction cups can be used in picking and/or placing a plurality of objects (e.g., four objects can be picked and placed at once through usage of the multiple suction cup(s).

Robot 170A can access a robot workspace 101A that, in FIG. 1A, includes sunglasses 192A on a conveyor portion 103A of a conveyor system, and also includes a container 193A. The robot 170A can utilize object manipulation parameters, determined as described herein, in grasping the sunglasses 192A and placing them appropriately in the container 193A. Other objects can be on the conveyor portion 103A in the robot workspace 101A at different times, as can different containers (e.g., the containers can be placed by a separate system or be on a separate conveyor system). For example, as the conveyor system moves, other objects will be transported into the robot workspace 101A and can be manipulated by the robot 170A while in the robot workspace 170A. The robot 170A can likewise utilize corresponding object manipulation parameters for picking and placing such objects, and/or performing other manipulations on such objects.

Robot 170B can access a robot workspace 101B that, in FIG. 1A, includes stapler 192B on a conveyor portion 103B of the conveyor system, and also includes a container 193B. The robot 170B can utilize object manipulation parameters, determined as described herein, in grasping the stapler 192B and placing it appropriately in the container 193B. Other objects can be on the conveyor portion 103B in the robot workspace 101B at different times, as can different containers. The robot 170B can likewise utilize corresponding object manipulation parameters for picking and placing such objects, and/or performing other manipulations on such objects.

The additional vision component 194 has a field of view of an area 101C of the environment that is disparate from the robot workspace 101A and disparate from the robot workspace 101B. In FIG. 1A, the area includes a conveyor portion 103C of the conveyor system, and also include a spatula 192C. The area 101C can be "upstream" of the robot workspace 101A and/or the robot workspace 101B, in that objects to be manipulated first pass through the area 101 prior to being transported to the robot workspace 101A or the robot workspace 101B. For example, the conveyor system can first pass objects through the area 101C before those objects are routed, by the conveyor system, to either the robot workspace 101A or the robot workspace 101B. For instance, in FIG. 1A the spatula 192C is in the area 101C, but has not yet been transported to the robot workspace 101A or the robot workspace 101B.

As described in detail herein, in various implementations additional vision component 194 can capture vision data that captures features of the spatula 192C. Further, the vision data can be utilized, by system 110 (described below), in determining object manipulation parameter(s) for enabling the robot 170A or robot 170B to manipulate (e.g., pick and place) the spatula 192C. For example, the system 110 can determine the object manipulation parameter(s) based at least in part on user interface input(s), from a remote client device 130, directed at a visual representation that is generated at least in part on the vision data captured by additional vision component 194 (e.g., based at least in part on object features, of the vision data, that capture features of the spatula 192C). Through utilization of the additional vision component 194 that is "upstream" of the robot workspaces 101A and 101B, the visual representation can be provided to the remote client device 130, user interface inputs provided at the remote client device 130, and/or object manipulation parameter(s) determined based on data that corresponds to the user interface input(s)—before the spatula 192C is in the robot workspace 101A or robot workspace 101B (i.e., prior to completion of transporting of the spatula to either of the robot workspaces 101A, 101B). In these and other manners, robots 170A and 170B can operate more efficiently, as the object manipulation parameter(s) for manipulating objects can be quickly determined, optionally before the objects even reach the robot workspaces 101A and 101B.

The example environment of FIG. 1A also includes a system 110, the remote client device 130, a training data engine 143, a training data database 152, a training engine 145, and one or more machine learning model(s) 165 (also referred to herein as "prediction model(s)").

The system 110 can be implemented by one or more computing devices. The one or more computing devices can be located in the environment with the robots 170A and 170B, and/or can be located in a remote server farm. The system 110 includes one or more prediction engines 112, a visual representation engine 114, and a manipulation parameters engine 116. The system 110 can perform one or more (e.g., all) of the operations of method 300 of FIG. 3 and/or method 500 of FIG. 5, both of which are described in detail below.

The remote client device 130 can optionally be within the environment but, in various implementations, is located in a disparate structure that can be miles away from the environment. The remote client device 130 includes a display engine 132, input engine(s) 134, and input device(s) 136. It is noted that in various implementations multiple remote client devices 130 are accessible to the system 110 at any given time. In those implementations, a given remote client device 130 can be selected at a given time based on various considerations such as whether the given remote client device 130 has any pending requests in its queue, a quantity of pending requests in its queue, and/or an anticipated duration for addressing the pending requests in its queue.

The prediction engine(s) 112 of system 110 can receive vision data from vision components 194, 174A, and/or 174B, and optionally other sensor data. The prediction engine(s) 112 can each utilize a corresponding one of the machine learning model(s) 165 to process the vision data and/or other sensor data, to generate one or more predicted object manipulation parameter(s) for manipulating an object captured by the vision data. For example, one of the prediction engine(s) 112 can process vision data, from additional vision component 194 and using a corresponding one of the machine learning model(s) 165, to generate a predicted grasp pose for grasping of the spatula 192C. Also, for example, one of the prediction engine(s) 112 can additionally or alternatively process vision data, from additional vision component 194 and using a corresponding one of the machine learning model(s) 165, to generate a predicted placement pose for placement of the spatula 192C. Also, for example, one of the prediction engine(s) 112 can additionally or alternatively process vision data, from additional vision component 194 and using a corresponding one of the machine learning model(s) 165, to generate predicted waypoints to encounter in traversing to a grasp pose for the spatula. As described herein, which prediction engine(s) 112 and corresponding machine learning model(s) 165 that are online and used by the system 110 (if any) can vary over time and can be dependent on sufficient training and/or validation of the machine learning model(s) (e.g., by the training engine 145).

Predicted object manipulation parameter(s) (if any) that are generated by the prediction engine(s) 112 for a given object manipulation, can be automatically used as manipulation parameters by the manipulation parameters engine 116, can be first presented for confirmation by the visual representation engine 114 before utilization, or can be discarded and not utilized. For example, one of the prediction engine(s) 112 can generate a predicted object manipulation parameter, and a confidence measure for the predicted object manipulation parameter. If the confidence measure satisfies a first threshold, that prediction engine can specify that the predicted object manipulation parameter is to be utilized by the manipulation parameters engine 116 without prompting for confirmation. If the confidence measure fails to satisfy the first threshold, but satisfies a second threshold, that prediction engine can specify that an indication of the predicted object manipulation parameter is to be included, by the visual representation engine 114, in a visual representation—and only utilized if confirmatory user interface input directed to the indication is received. If the confidence measure fails to satisfy the first threshold and the second threshold, that prediction engine can specify that the predicted object manipulation parameter not be utilized and that the visual representation engine 114 prompt for defining of a corresponding object manipulation parameter.

The visual representation engine 114 receives vision data from vision components 194, 174A, and/or 174B, and generates a visual representation to transmit to the remote client device 130 for rendering by the display engine 132 of the remote client device 130. The transmission to the remote client device 130 can be via one or more networks (not illustrated) such as the Internet or other wide area network (WAN).

The visual representation generated by visual representation engine 114 includes an object representation of the at least one object captured by the vision data. For example, the visual representation can include an object representation of the spatula 192 captured in vision data from the additional vision component 194. For instance, the visual representation can include an object representation that is a two-dimensional (2D) image of the spatula 192. Examples of 2D images of the spatula 192 are illustrated in FIGS. 2D and 2E, described in more detail below. Also, for instance, the visual representation can include an object representation that is a three-dimensional (3D) representation of the spatula 192. For instance, the 3D representation of the spatula 192 can define positions (e.g., x, y, z position) for one or more points on a surface of the spatula, and can optionally include one or more color values for each of the positions. Examples of 3D representations of the spatula 192 are illustrated in FIGS. 2A, 2B, and 2C, described in more detail below. The visual representation can also optionally include indication(s) of predicted object manipulation parameter(s) (if any), from prediction engine(s) 112. An example of a predicted object manipulation parameter from prediction engine(s) 112 is illustrated in FIG. 2E, described in more detail below. The visual representation can also optionally include an environmental representation of other environmental objects (e.g., a work surface, a container in which the at least one object is to be placed) and/or a robot representation of all or parts of the robot.

In some implementations, the visual representation generated by visual representation engine 114 and transmitted to the remote client device 130 includes an object representation of the object and optionally one or more object representation(s) of other nearby dynamic object(s), but omits other portion(s) that are static. In some of those implementations, only the object and optionally nearby dynamic objects are rendered at the remote client device 130. In some implementations, all or portions of the robot and/or robot workspace are also rendered at the remote client device 130, despite not being captured in the vision data that is transmitted to the remote client device 130. For example, the display engine 132 of the remote client device can include a robotic simulator. The robotic simulator can simulate all or parts of the robot and/or all or parts of the robot workspace, and can render a simulation of the object along with the robot simulation and/or robot workspace simulation. The robotic simulator can be used to simulate an environment that includes corresponding object(s), to simulate all or parts of a robot (e.g., at least end effector(s) of the robot) operating in the simulated environment, and to optionally simulate interactions between the simulated robot and the simulated environmental objects in response to simulated robotic actions. Various simulators can be utilized, such as physics engines that simulates collision detection, soft and rigid body dynamics, etc. One non-limiting example of such a simulator is the BULLET physics engine.

As one particular example, the display engine 132 of the client device can receive a visual representation that includes only a 3D object representation of an object to be manipulated. The display engine 132 can place the 3D object representation in a simulated robot workspace and/or relative to a simulated robot. For example, a robotic simulator of the display engine 132 can have a visual representation of the robot workspace and/or of the robot pre-loaded, and can place the 3D object representation relative to those objects. When the object representation is based on vision data from the additional vision component 194, the pose of the object relative to the robot simulation and/or robot workspace simulation can optionally be determined using a transformation between a pose of the additional vision component 194 and a pose of a corresponding one of the robotic vision components 174A, 174B. The simulated robot can be set to a default state (e.g., starting state), or a current state of the robot (e.g., current positions of the joints) can optionally be provided with the visual representation for rendering of the simulated robot in the current state. Implementations that simulate the robot and/or robot workspace enable smaller data size visual representations to be transmitted from the system 110 to remote client device 130.

In some implementations, the visual representation engine 114 generates object representations, of visual representations to be rendered at a client device, that render objects with less accuracy than full representations, but are a smaller data size than full representations. For example, the visual representation engine 114 can generate an object representation that includes one or more bounding boxes and/or other bounding shapes that approximate surfaces of the objects. For instance, the visual representation engine 114 can generate an object representation that consists of a plurality of connected bounding boxes, each of which can be defined by a center point, a height dimension, and a width dimension. One non-limiting example of this is illustrated in FIG. 2F, described in more detail below. The less detailed object representations can be more data concise, thereby conserving network resources. Moreover, the less detailed object representations can mitigate delay in rendering the visual representation at the remote device and/or can obfuscate or remove potentially sensitive data from object(s), or obfuscate the objects themselves.

An operator of the remote client device 130 interacts with a visual representation, provided by display engine 132, utilizing one or more input devices 136 of the remote client device 130. The input device(s) 136 can include, for example, a mouse, a touchscreen, VR hand controllers, and/or VR gloves. The input device(s) 136 can form an integral part of the remote client device (e.g., a touchscreen), or can be peripheral devices that are coupled with the remote device 130 using wired and/or wireless protocols.

The input engine(s) 134 of remote client device 130 process user interface input(s), provided via the input device(s) 136, to generate data that indicates (directly or indirectly) one or more object manipulation parameter(s) to be used in an object manipulation. For example, the object manipulation parameter(s) indicated by the data generated by the input engine(s) 134 of an instance of user interface input(s) can include: a grasp pose; a placement pose; a sequence of waypoint(s) to encounter in traversing to a grasp pose; a sequence of waypoints to encounter in traversing toward a placement pose (after grasping the object); a full path or trajectory (i.e., a path with velocity, acceleration, jerk, and/or other parameter(s)) in traversing to and/or from a manipulation pose (e.g., a grasp pose or other manipulation pose); and/or other object manipulation parameter(s). The user interface input(s) of an instance are provided by an operator of the remote client device 130, with reference to a visual representation rendered by display engine 132. For instance, an instance of user interface inputs can indicate a full trajectory that is utilized during assembly of a part utilizing a plurality of component parts.

The manipulation parameters engine 116 determines the manipulation parameters based on the data provided by the input engine(s) 134. In some implementations, the data directly defines the object manipulation parameters, and the manipulation parameters engine 116 determines the object manipulation parameters by utilizing the object manipulation parameters defined by the data. In other implementations, the manipulation parameters engine 116 transforms and/or otherwise processes the data in determining the object manipulation parameters.

The manipulation parameter engine 116 transmits, to the robot 170A or 170B, the determined object manipulation parameter(s) and/or commands generated based on the object manipulation parameter(s). In some implementations, manipulation parameter engine 116 transmits the object manipulation parameter(s) and/or high-level commands that are based on the object manipulation parameter(s). In those implementations, a control system of the corresponding robot transforms the object manipulation parameter(s) and/or high-level commands to corresponding low-level actions, such as control command(s) issued to actuators of the robot. In other implementations, the object manipulation parameter(s) can themselves define the low-level actions (e.g., when a full trajectory is define via user interface input(s)) and/or the low-level actions can be generated based on the object manipulation parameter(s), and the manipulation parameter engine 116 transmits the low-level actions to the corresponding robot for control based on the low-level actions.

The training data engine 143 generates training instances and stores the training instance in training data database 152. Each of the training instances is generated for a corresponding one of machine learning model(s) 165, and is generated based on corresponding manipulation parameter(s) of an instance, vision data and/or other data for the instance, and optionally a measure of success (also referred to herein as a "success measure") for the instance.

As one example, the training data engine 143 can receive, from manipulation parameters engine 116, a manipulation parameter utilized in controlling one of the robots 170A, 1706 in performing a manipulation. The manipulation parameter can be one generated based on user interface input from the remote client device 130, predicted by one of the prediction engine(s) 112 and confirmed based on user interface input from the remote client device, or predicted by one of the prediction engine(s) 112 and automatically utilized. The training data engine 143 can further receive vision data for the instance, such as vision data that captures the object that was manipulated in the manipulation. The vision data can be from the additional vision component 194, or from one of the robotic vision components 174A or 174B. It is noted that in some implementations the vision data utilized by training data engine 143 in generating a training instance can differ from that utilized in generating the object manipulation parameter. For example, the object manipulation parameter can be defined based on user interface input(s) directed to an object representation generated based on vision data from additional vision component 194, but vision data from robotic vision component 174A (that captures the object) can be used in generating the training instance.

The training data engine 143 can optionally further determine a measure of success of the manipulation (as a whole, and/or of the portion directed to the object manipulation parameter) based on vision data and/or data from other sensor(s) 104. The other sensor(s) 104 can include, for example, weight sensor(s) in the environment, non-vision sensor(s) of the robot (e.g., torque sensors, position sensors), and/or other sensor(s). The training data engine 143 can then generate a training instance based on the vision data, the object manipulation parameter, and optionally the measure of success. For example, the training instance can include the vision data and the object manipulation parameter (e.g., representations thereof) as training instance input, and the measure of success as training instance output. As another example, the training instance can include the vision data as training instance input, the object manipulation parameter as training instance output, and can be labeled as a positive or negative training instance based on the measure of success. As yet another example, the training instance can include the vision data as training instance input and, as training instance output, a value that corresponds to the object manipulation parameter and that is determined based on the measure of success.

The training engine 145 trains the machine learning model(s) 165 utilizing corresponding training instance of the training data database 152. A trained machine learning model can then be at least selectively utilized by one of the prediction engine(s) 112 in predicting one or more corresponding object manipulation parameters that are then at least selectively utilized in controlling the robot(s). In some implementations, a trained machine learning model is only utilized, in predicting object manipulation parameters that are at least selectively utilized, after the training engine 145 determines one or more conditions are satisfied. The one or more conditions can include, for example, at least a threshold amount of training and/or validation of the trained machine learning model as described herein. In some implementations, the training data engine 143 and the training engine 145 can implement one or more aspects of method 400 of FIG. 4, described in detail herein.

Figure 1B:
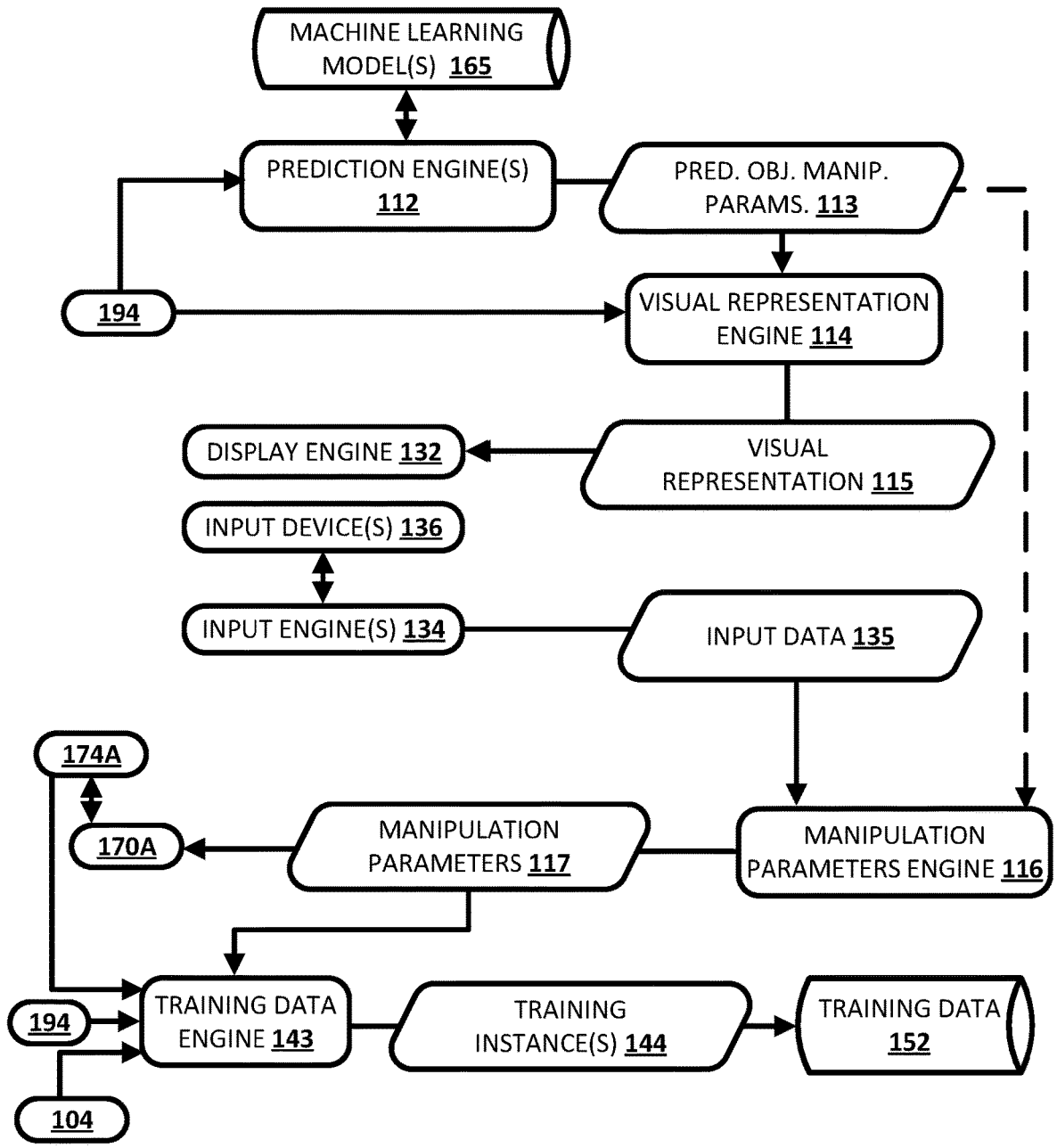
FIG. 1B illustrates an example of how components of FIG. 1A may interact in accordance with various implementations described herein.

Turning now to FIG. 1B, an example is illustrated of how components of FIG. 1A can interact with one another in accordance with various implementations described herein. In FIG. 1B, vision data from additional vision component 194 is provided to prediction engine(s) 112 and to visual representation engine 114. For example, the vision data can capture the spatula 192 illustrated in FIG. 1A. The prediction engine(s) 112 can generate predicted object manipulation parameter(s) 113, based on processing the vision data using one or more machine learning model(s) 165. The visual representation engine 114 generates a visual representation 115 that includes at least an object representation of an object, where the object representation is based on object features of the vision data. In some implementations, the visual representation 115 can also include an indication of the predicted object manipulation parameter(s) 113 (e.g., when corresponding confidence measure(s) indicate confirmation is needed). Additionally or alternatively, and as indicated by the dashed arrow, the predicted object manipulation parameter(s) 113 can be provided directly to the manipulation parameter(s) engine 116 without including an indication thereof in the visual representation 115 or soliciting confirmation (e.g., when corresponding confidence measure(s) indicate confirmation is not needed).

The visual representation 115 is transmitted to the display engine 132, which renders the visual representation, optionally along with other simulated representation(s) (e.g., a simulated robot and/or a simulated workspace). Input data 135 is generated by input engine(s) 134 responsive to one or more user interface inputs provided at one or more input device(s) 136 and directed at the visual representation. The input data 135 indicates, directly or indirectly, one or more additional object manipulation parameter(s) and/or confirmation(s) of any predicted object manipulation parameter(s) indicated in the visual representation 115.

The manipulation parameters engine 116 utilizes the input data, and optionally any directly provided predicted object manipulation parameter(s) 113, to generate object manipulation parameters 117 that are provided to robot 170A for implementation. For example, robot 170A can generate control commands that are based on the object manipulation parameters 117, and can implement them responsive to determining the object has entered the robot workspace of robot 170A and/or is at a particular pose within the robot workspace. For example, the robot 170A can make such determination(s) based on robotic vision data from robotic vision component 174A.

The training data engine 143 can generate training instance(s) 144 based on the implemented manipulation parameters 117. Each of the training instance(s) 144 can include training instance input that is based on vision data, from additional vision component 194 and/or from robotic vision component 174. Each of the training instance(s) 144 can further be based on a corresponding one of the manipulation parameters 117 (e.g., the training instance input or output can be based on a manipulation parameter). Each of the training instance(s) 144 can further be based on a corresponding success measure determined by training data engine, based on vision data from vision component(s) 174A and/or 194, and/or based on data from other sensor(s) 104. The training instance(s) 144 are stored in training data database 152, for utilization by training engine 145 (FIG. 1) in training one or more of the machine learning model(s) 165.

Turning now to FIGS. 2A, 2B, 2C, 2D, 2E, and 2F, each of those figures illustrates an example of a visual representation that can be rendered at remote client device 130 (FIG. 1A) or other remote client devices. Each of the visual representations includes an object representation of an object to be manipulated by a robot, and illustrates examples of user interface inputs that can be provided to define and/or confirm object manipulation parameter(s) for manipulation of the object by the robot.

FIG. 2A illustrates a visual representation that includes a simulated environment with a robot simulation 270A of one of the robots of FIG. 1A. Further, an object representation 292A of the spatula 192C of FIG. 1A is illustrated in the simulated environment. As described herein, the pose of the object representation 292A can be determined based on vision data that captures the spatula 192C and is utilized to generate the object representation 292A, optionally taking into account a transformation to a robot reference frame. The visual representation of FIG. 2A can be rendered, for example, via a VR headset.

An operator has provided user interface input (e.g., via VR controller(s)) to define a path 289A1 of the end effector of the robot from a starting pose (not illustrated) to the illustrated grasp pose. The operator can, for example, actuate a first virtual button (e.g., virtual button 282A1) or hardware button to start defining of the path 289A1, and actuate a second virtual or hardware button to define an end of the path 289A1, which also constitutes the grasp pose. Although not illustrated, it is noted that the simulated robot 270A can "move" during defining of the trajectory 289A1 to provide the operator with visual feedback of the path 289A1 as it will be implemented by the robot 270A.

Also illustrated in FIG. 2A is a virtual button 282A2, which can be selected by the operator to use a predefined path that was "saved" by the operator after being defined for a previous instance of user interface inputs. Selecting the virtual button 282A2 can paste the predefined path into the virtual environment, along with an option for the user to modify the pre-defined path to adapt it for the particular object. Also illustrated in FIG. 2A is a virtual button 282A3, which can be selected by the operator to define the path 289A1 as a path that can later be selected as "predefined path". Enabling an operator to save and reuse certain paths can reduce the amount of user interface input required to redefine that path, or a path that is a slight variation of the predefined path. In addition, this can enable a path for a current instance to be defined more quickly, which can mitigate idle time of the robots while awaiting definition of object manipulation parameter(s) and/or can increase productivity of the operator.

FIG. 2B illustrates a visual representation that includes a simulated environment with a robot simulation 270B of one of the robots of FIG. 1A. Further, an object representation 292B of the spatula 192C of FIG. 1A is illustrated in the simulated environment. An operator has provided user interface input (e.g., via VR controller(s)) to define waypoints 289B1 and 289B2 (in lieu of a full path) and a grasp pose 289B3, where the waypoints are to be encountered in traversing to the grasp pose 289B3, and the grasp pose 289B3 is to be utilized in grasping the spatula 192C. The operator can, for example, actuate a first hardware button (e.g., of a VR controller) in a first manner to define the waypoints 289B1 and 289B2, and can actuate the first hardware button in a second manner (or actuate a second hardware button) to define the grasp pose 289B3. Although not illustrated, it is noted that the simulated robot 270B can "move" during defining of the waypoints 289B1, 289B2 and/or of the grasp pose 289B3 to provide the operator with visual feedback. Although not illustrated in FIG. 2B, virtual buttons could also be provided for saving the waypoints 289B1 and 289B2, and/or re-using (and possibly adapting) pre-defined waypoints.

FIG. 2C illustrates a visual representation that includes a simulated environment with a robot simulation 270C of one of the robots of FIG. 1A. Further, an object representation 292C of the spatula 192C of FIG. 1A is illustrated in the simulated environment. An operator has provided user interface input (e.g., via VR controller(s)) to define only a grasp pose 289C1. The operator can, for example, actuate a first hardware button (e.g., of a VR controller) to define the grasp pose 289C1. Although not illustrated, it is noted that the simulated robot 270C can "move" during defining of the grasp pose 289C1 to provide the operator with visual feedback. In some implementations, visual representations akin to FIGS. 2A and/or 2B can be provided until machine learning model(s) are trained that enable predicting of paths or waypoints that can at least selectively be automatically implemented (without requiring confirmation), and visual representations akin to FIG. 2C can thereafter be provided for defining of only the grasp pose via user interface input. Optionally, FIG. 2C can also visually indicate a predicted path and/or predicted waypoints, and prompt for confirmation of the predicted waypoints or path, or redefining of the predicted waypoints or path (if not confirmed).

FIG. 2D illustrates a visual representation that includes an object representation 292D, of the spatula 192C of FIG. 1A, that is a 2D image (e.g., RGB image) of the spatula. The visual representation can be rendered, for example, on a touchscreen of a remote client device. The operator of the client device is prompted, by indication 282D, to swipe on the touchscreen to define an antipodal grasp. In response, the operator touches the touchscreen at 289D1 and swipes over to 289D2, at which point the operator releases his/her touch. As a result, an antipodal grasp is defined with a first point at 289D1 and a second point at 289D2. The points 289D1 and 289D2 can be transformed from 2D to 3D points using, for example, a mapping between the 2D image and corresponding 2.5D or 3D vision data.

FIG. 2E illustrates a visual representation that includes an object representation 292E, of the spatula 192C of FIG. 1A, that is a 2D image (e.g., RGB image) of the spatula. The visual representation also include an indication 288E of a predicted antipodal grasp. The visual representation can be rendered, for example, on a screen of a remote client device. The operator of the client device is prompted, by indication 282E1, to confirm the predicted antipodal grasp of indication 288E or, alternatively (by indication 282E2), to define an alternate grasp. If the operator agrees with the predicted antipodal grasp of indication 288E, he/she can simply click/tap the indication 282E1. If the operator disagrees with the predicted antipodal grasp of indication 288E, he/she can click/tap the indication 282E2 and alter the indication 288E (e.g., drag it up/down, change the width, etc.) or define a new antipodal grasp from scratch.

FIG. 2F illustrates a visual representation that includes an object representation 292F, of the spatula 192C of FIG. 1A, that includes three connected bounding boxes (dashed lines) that approximate surfaces of the spatula 192A. As described herein, the object representation 292F can be more data efficient than the representation of FIGS. 2D and 2E and/or can prevent potentially sensitive data from being viewed by an operator of the client device. The visual representation can be rendered, for example, on a touchscreen of a remote client device. The operator of the client device is prompted, by indication 282DF, to swipe on the touchscreen to define an antipodal grasp. In response, the operator touches the touchscreen at 289F1 and swipes over to 289FD2, at which point the operator releases his/her touch. As a result, an antipodal grasp is defined with a first point at 289F1 and a second point at 289F2.

Various examples of visual representations and interactions with visual representations are illustrated in FIGS. 2A-F. However, it is understood that additional and/or alternative visual representations and/or interactions can be utilized in various implementations disclosed herein.

Figure 3:
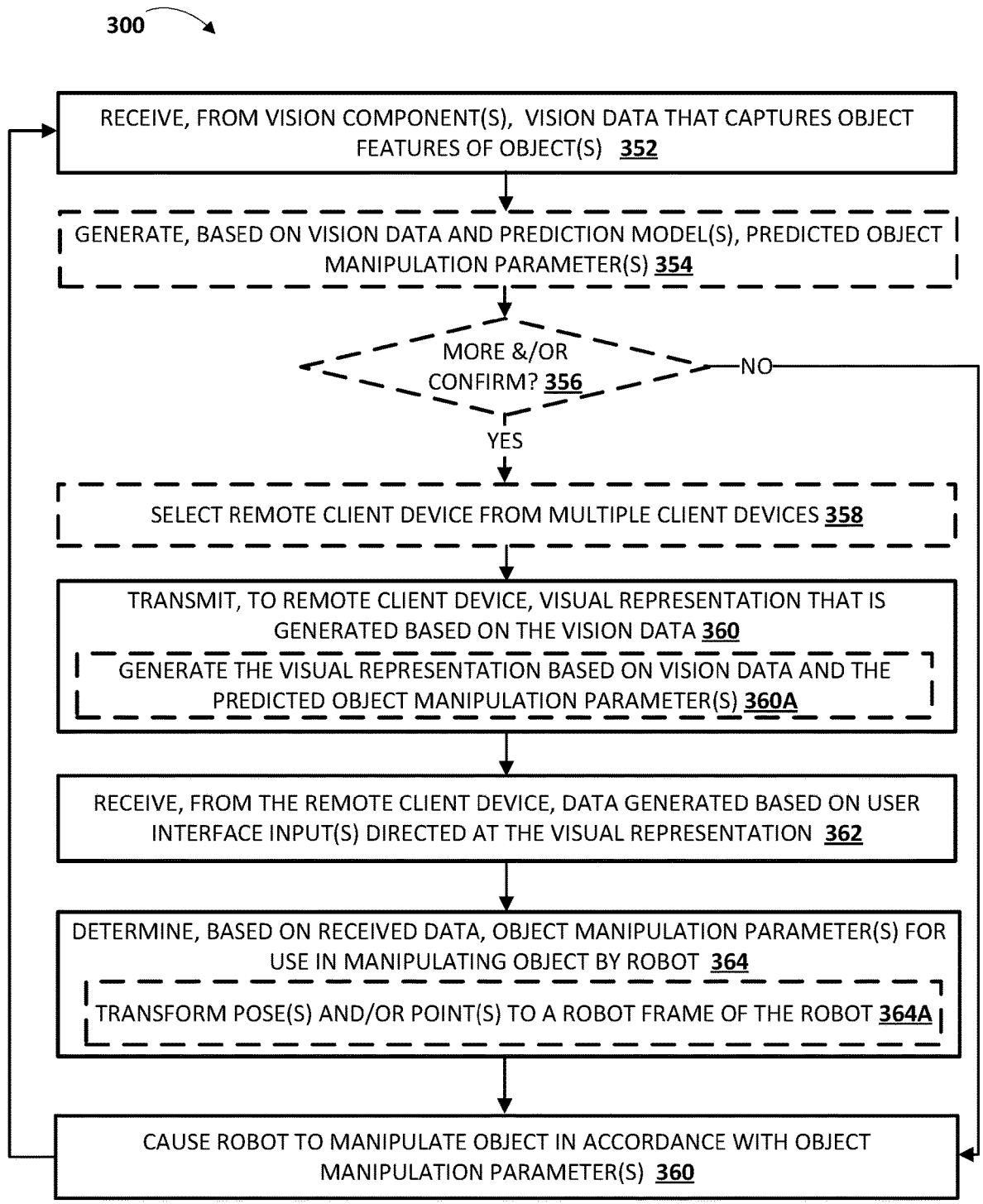
FIG. 3 is a flowchart illustrating an example method of causing a robot to manipulate an object in accordance with object manipulation parameter(s) determined based on data generated, at a remote client device, responsive to a visual representation that includes an object representation of the object.

Turning now to FIG. 3, an example method 300 is illustrated of causing a robot to manipulate an object in accordance with object manipulation parameter(s) determined based on data generated, at a remote client device, responsive to a visual representation that includes an object representation of the object. For convenience, some of the operations of the method 300 are described with reference to a system that performs the operations. This system may include various components of various computer systems and/or robots, such as one or more components depicted in FIGS. 1A and 1B. Moreover, while operations of the method 300 are shown in a particular order, this is not meant to be limiting. One or more operations may be reordered, omitted or added.

At block 352, the system receives, from one or more vision components, vision data that captures object features of one or more objects. In some implementations or iterations of method 300, the vision components are robotic vision components that view a robot workspace of a corresponding robot and the vision data captures the object features when the object(s) are in the robot workspace. In some other implementations or iterations, the vision components are in a first area of an environment that is disparate from a robot workspace of the environment, and the vision data captures the object features when the object(s) are in the first area—and prior to completion of transporting of the object(s) to the robot workspace. In some of those implementations, one or more of blocks 354, 356, 358, 360, 362, and/or 364 can be completed prior to completion of transporting of the object(s) to the robot workspace.

At optional block 354, the system generates, based on vision data and prediction model(s), one or more predicted object manipulation parameters. For example, the system can process vision data and/or other sensor data, using a corresponding prediction model that has been trained and brought online, to generate a predicted grasp pose, and optionally a predicted probability for the predicted grasp pose. As another example, the system can additionally or alternatively process vision data and/or other sensor data, using a corresponding prediction model that has been trained and brought online, to generate a predicted classification of an object to be grasped, and optionally a predicted probability for the predicted classification. The predicted classification can be used to determine a predicted placement location for the object (e.g., in a particular container, of a plurality of available containers, that corresponds to the predicted classification). The predicted probability for the predicted classification can optionally be utilized as the probability for the predicted classification.

At optional block 356, the system determines whether: (a) more object manipulation parameter(s), that are in addition to the predicted manipulation parameter(s) of block 354, are needed in order to manipulate the object; and/or (b) whether one or more of the predicted object manipulation parameter(s) need to be confirmed by remote user interface input (e.g., due to a corresponding predicted probability failing to satisfy a threshold).

If, at block 356, the determination(s) are "no", the system proceeds directly to block 360 and causes the robot to manipulate an object in accordance with the object manipulation parameters which, in such a situation, would correspond to the predicted object manipulation parameters of block 354.

If, at block 356, the determination(s) are "yes", the system proceeds to optional block 358, or to block 360.

Blocks 354 and 356 are illustrated as optional (as indicated by dashed lines), as they may not be utilized in method 300 in various implementations and/or as they can, in other implementations, only be utilized in some iterations. For example, in some of the other implementations, block 354 may only be implemented once at least one prediction model has been trained and brought online, which can be contingent on satisfaction of one or more conditions as described herein.

At optional block 358, the system select a remote client device, from multiple client devices. The system can select the remote client device based on various considerations. For example, the system can select the remote client device responsive to determining the remote client device does not currently have any requests for object manipulation parameter(s) in its queue. Also, for example, the system can select the remote client device additionally or alternatively responsive to determining that a quantity of pending requests for the remote client device and/or an anticipated duration for pending requests, is less than that of other candidate remote client device(s) (e.g., those available for utilization in the environment in which the robot(s) utilized in method 300 are deployed). As yet another example, the system can select the remote client device based on a proficiency measure for an operator of the remote client device. The proficiency measure can be based on past success measures for manipulation(s) that are based on object manipulation parameter(s) determined based on user interface input(s) from the operator, and can be a global proficiency measure or specific to one or more particular manipulation(s) (e.g., a first proficiency measure for grasping and placing manipulations, a second proficiency measure for grasping two object and joining them manipulations, etc.).

At block 360, the system transmits, to a remote client device (e.g., the one selected at block 358), a visual representation that is based on the vision data of block 352. The visual representation includes at least an object representation that is based on the object features of the vision data of block 352. In some implementations, the object representation comprises less data than the object features of the vision data of block 352. For example, the object representation can define bounding shape(s) that each approximate a corresponding area of the object, without defining color and/or other value(s) for individual pixels or voxels encompassed by the bounding shape(s) in the vision data. For instance, values for 64 pixels or voxels in the vision data can be replaced by 7 values: 3 that define x, y, z coordinates of a center of a bounding box, 2 that collectively define an orientation of the bounding box, and two that define width and height of the bounding box.

In some implementations, the visual representation transmitted at block 360 lacks any representation of a robot and/or lacks any representation of one or more static objects and/or other object(s) in the robot workspace of the robot. In some of those implementations, the client device renders the transmitted visual representation along with a simulation of the robot and/or a simulation of all or parts of the robot workspace. For example, the remote client device can execute a robotic simulator that simulates the robot and the robot workspace, and can render the object representation within the robotic simulator and along with the simulated robot and robot workspace. It is noted that this can conserve network resources by obviating the need to transmit a representation of the robot and/or robot workspace with each transmission of a visual representation to a remote client device. It is also noted that the simulated robot and/or simulated robot workspace can be rendered, and the object representation appropriately rendered therewith, even when the vision data of block 352 is captured in the first area that is disparate from the robot workspace.

Optionally, block 360 includes sub-block 360A, in which the system generates the visual representation based on the vision data, and based on the predicted manipulation parameter(s) (if any) of block 354. For example, if a predicted grasp pose is generated at block 354, an indication of the predicted grasp pose can optionally be included in the visual representation. For example, the indication of the predicted gasp pose can be a representation of a robotic end effector, rendered in the predicted grasp pose, along with the object representation. An operator of the remote client device can confirm the predicted grasp pose, or propose an alternate grasp pose (e.g., by adjusting the representation of the robotic end effector). As another example, if a predicted series of waypoints is generated at block 354, an indication of those waypoints can optionally be include in the visual representation. For example, the indication of the waypoints can be circles or other indicia of the waypoints, rendered along with the object representation and/or a robot simulation.

At block 362, the system receives, from the remote client device, data generated based on user interface input(s) directed at the visual representation transmitted at block 360. The user interface input(s) can include those that define (directly or indirectly) object manipulation parameter(s) and/or those that confirm predicted object manipulation parameter(s).

At block 364, the system determines, based on data received at block 362, object manipulation parameter(s) for use in manipulating the object, by a robot. The object manipulation parameter(s) can include those that are based on predicted object manipulation parameter(s) (if any) that are indicated in the visual representation, if the data indicates confirmation of those predicted object manipulation parameter(s). The object manipulation parameter(s) can additionally or alternatively include those that are defined, based on the user interface input(s), independent of any predicted object manipulation parameter(s).

In some implementations, the data generated at the remote client device directly defines the object manipulation parameters, and can be utilized directly as the object manipulation parameters. In some other implementations, the data indirectly defines the object manipulation parameters, and is further processed in determining the object manipulation parameters. As one non-limiting example, block 364 can optionally include sub-block 364A, in which the system transforms pose(s) and/or points to a robot frame of the robot. For example, pose(s), point(s) (e.g., waypoints), and/or other features defined by the data received at block 362 can be defined relative to a given frame that is disparate from a robot frame, then transformed to the robot frame. For instance, the given frame can be a first frame of a vision component, of block 352, that is disparate from a robot vision component of the robot.

At block 360, the system causes the robot to manipulate the object in accordance with the object manipulation parameter(s). The object manipulation parameters(s) can include those that are based on predicted object manipulation parameter(s) and/or those that are defined, based on the user interface input(s), independent of any predicted object manipulation parameter(s). In some implementations, the system provides, to the robot, the object manipulation parameter(s) and/or high-level commands that are based on the object manipulation parameter(s). In those implementations, a control system of the robot transforms the object manipulation parameter(s) and/or high-level commands to corresponding low-level actions, such as control command(s) issued to actuators of the robot. For example, the robot can include a controller that translates high level commands into more specific control commands to provide to one or more actuators of the robot. The control commands can include one or more velocity control command(s) issued to actuator(s) of the robot at a corresponding instance, to control movement of the robot. For example, in controlling movement of the robot, velocity control commands can be issued to each of the actuators that control movement of an end effector of the robot. In other implementations, the object manipulation parameter(s) can themselves define the low-level actions (e.g., when a full trajectory is define via user interface input(s)) and/or the low-level actions can be generated based on the object manipulation parameter(s), and the low-level action provided to the robot for control based on the low-level actions.

In implementations where the vision components are in a first area of an environment that is disparate from a robot workspace of the environment, block 360 can include causing the robot to manipulate the object further responsive to determining the object is within the robot workspace. In some of those implementations, the robot can determine the object is within the robot workspace based on robot vision data, from vision component(s) of the robot. In some additional or alternative implementations, the object can be determined to be within the workspace based on data, from the transporting mean(s) for the object, indicating the object is within the workspace. For example, when the transporting mean(s) include a conveyor system, a time of arrival of the object within the robot workspace can be determined based on operational data of the conveyor system.

After block 360, the system then returns to block 352. It is noted that in various implementations multiple iterations of method 300 can be running in parallel for a given environment, enabling visual representations for new object(s) to be generated, transmitted, corresponding data received, and/or corresponding object manipulation parameter(s) determined—prior to completion of method 300 for a previous object (e.g., at least prior to completion of block 360). For example, multiple iterations of method 300 can be running in parallel, each for a different robot of an environment. Also, for example, multiple iterations of method 300 can be running in parallel for a given robot, enabling object manipulation parameter(s) to be determined for each of a plurality of disparate objects, prior to those objects reaching the robot workspace of the given robot and being manipulated by the given robot.

Figure 4:
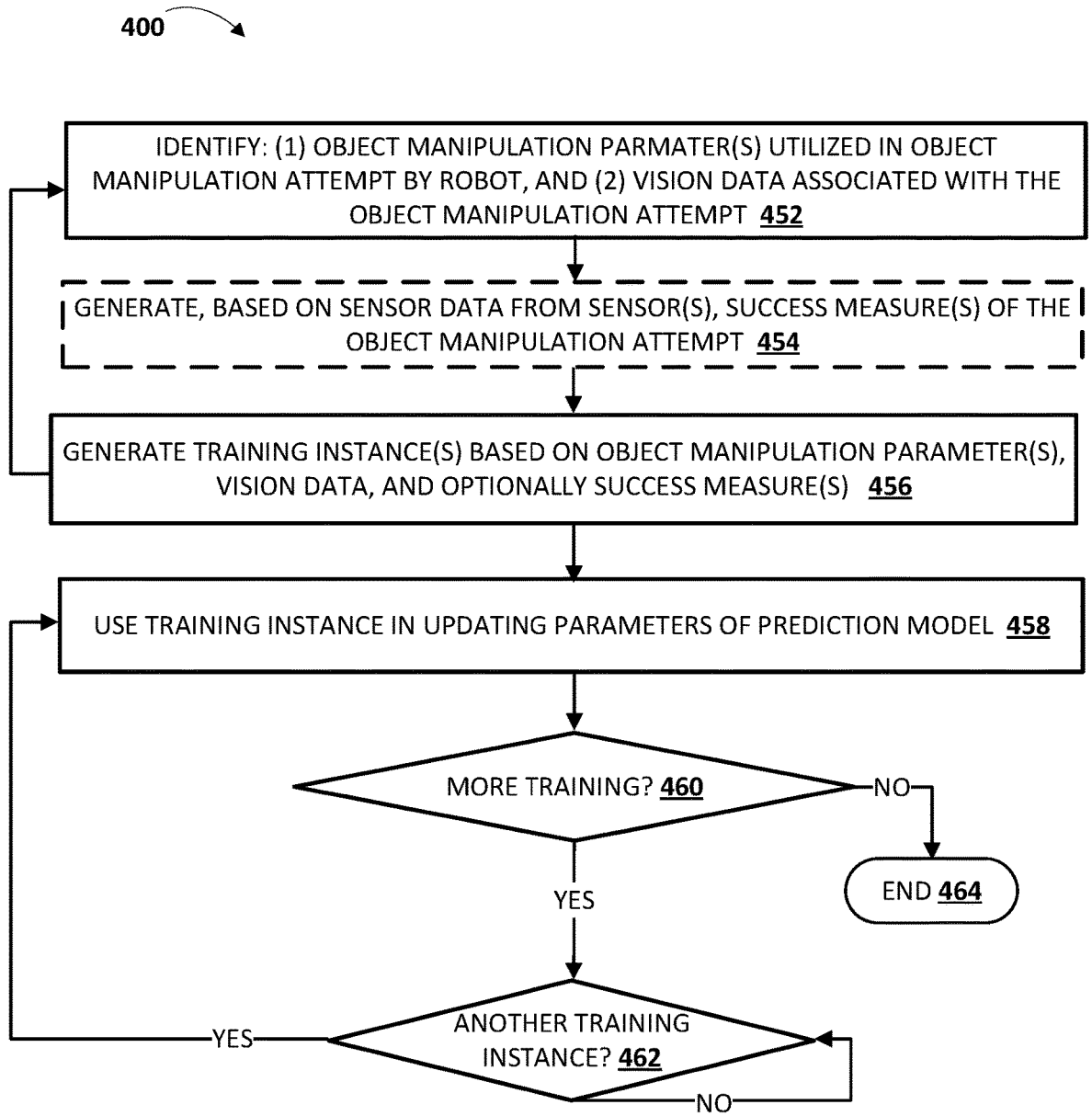
FIG. 4 is a flowchart illustrating an example method of generating training instances based on robotic object manipulation attempts, and using the training instances in training prediction model(s).

Turning now to FIG. 4, an example method 400 is illustrated of generating training instances based on robotic object manipulation attempts, and using the training instances in training prediction model(s). For convenience, some of the operations of the method 400 are described with reference to a system that performs the operations. This system may include various components of various computer systems and/or robots, such as one or more components depicted in FIGS. 1A and 1B. Moreover, while operations of the method 400 are shown in a particular order, this is not meant to be limiting. One or more operations may be reordered, omitted or added.

At block 452, the system identifies: (1) object manipulation parameter(s) utilized in an object manipulation attempt by a robot; and (2) vision data associated with the object manipulation attempt. For example, the object manipulation parameter(s) can include a grasp pose and a placement pose defined based on user interface input(s) directed to a visual representation generated based on vision data from a first area, and the vision data can robotic vision data from a robot workspace, that is disparate from the first area.

At optional block 454, the system generates, based on sensor data from sensor(s), success measure(s) of the object manipulation attempt. In some implementations, the system generates a single success measure for the entire object manipulation attempt. For example, for a pick and place manipulation, the system can determine a single success measure that is based on whether the object was placed successfully and/or an accuracy of the placement. In some other implementations, the system generates multiple success measures for the object manipulation attempt, with each corresponding to a corresponding subset of object manipulation parameter(s). For example, for a pick and place manipulation, the system can determine a first success measure for the pick manipulation (e.g., based on whether the object was successfully grasped), and a second success measure for the place manipulation (e.g., based on whether the object was placed successfully and/or an accuracy of the placement). The sensor(s) on which the success measure can be based can include, for example, position sensor(s) of a robot, torque sensor(s) of the robot, robot vision data from vision component(s) of the robot, weight sensor(s) in the environment, and/or other robot and/or environment sensor(s).

At block 456, the system generates training instance(s) based on the object manipulation parameter(s), the vision data, and optionally the success measure(s). As indicated by the arrow from block 456 to block 452, the system can continue to perform iterations of blocks 452, 454, and 456 to generate additional training instances based on additional object manipulation attempts.

As an example of block 456, assume a pick and place manipulation with grasp pose and placement pose manipulation parameter(s). A first training instance can be generated based on the vision data and the grasp pose, and based on a success measure (e.g., a success measure for the grasp or an overall success measure for the picking and placing). For instance, the first training instance can be for a grasp prediction model that approximates a value function, and is used to process the vision data and the grasp pose, and predict a probability of success of grasping the object using the grasp pose, and in view of the vision data. In such an instance, the training instance input would include the vision data and the grasp pose (e.g., a representation of x, y, and z positions, as well as orientation), and the training instance output would include the success measure (e.g., a "0" if the success measure indicated a failed grasp, and a "1" if the success measure indicated a successful grasp). Also, for instance, the first training instance can instead be for a prediction model that processes vision data (without also processing the grasp pose) and generates a corresponding probability for each of N grasp poses. In such an instance, the training instance input would include the vision data, and the training instance output would include, if the success measure indicated a successful grasp, a "1" for an output value corresponding to the grasp pose, and optionally a "0" for all other values. A second training instance can be generated based on the vision data and the placement pose, and based on a success measure (e.g., a success measure for the grasp or an overall success measure for the picking and placing). For instance, the second training instance can be for a placement prediction model that approximates a value function, and is used to process the vision data and the placement pose, and predict a probability of placement of the object being successful when using the grasp pose, in view of the vision data. In such an instance, the training instance input would include the vision data and the placement pose (e.g., a representation of x, y, and z positions, as well as orientation), and the training instance output would include the success measure (e.g., a "0" if the success measure indicated an unsuccessful placement, a "1" if the success measure indicated a successful placement, a "0.7" if the success measure indicated a successful, but not fully accurate, placement, etc.).

As another example of block 456, assume a manipulation with manipulation parameter(s) that include a sequence of waypoints defined based on user interface input(s). A training instance can be generated based on the vision data and the sequence of waypoints. For instance, the training instance can be for a waypoints prediction model that approximates a value function, and is used to process the vision data and the sequence of waypoints, and predict a probability of the sequence of waypoints in view of the vision data. In such an instance, the training instance input would include the vision data and a representation of the sequence of waypoints (e.g., an embedding of the sequence generated using a recurrent neural network model or transformer network), and the training instance output would include a "1" (or other "positive" value) based on that sequence having been defined based on user interface input(s).

At block 458, the system uses a generated training instance in updating parameters of a prediction model. Where different training instances for different prediction models were generated in block 456, an appropriate training instance for a corresponding prediction model can be utilized in each iteration of block 458. For example, some iterations of block 458 can use a first type of training instance to train a first prediction model, other iterations can use a second type of training instance to train a second prediction model, etc. Further, multiple iterations of blocks 458, 460, and 462 can optionally operate in parallel, each devoted to training a corresponding prediction model.

At block 460, the system determines whether more training is needed. In some implementations, this can be based on whether a threshold quantity of training has occurred, a threshold duration of training has occurred, and/or whether one or more performance characteristics of the prediction model have been observed (e.g., in use of the prediction model, high probability predictions and/or successful manipulations in at least X % of manipulations). In some implementations, training of a prediction model can continue indefinitely, at least on a periodic basis.

If the decision of block 460 is "yes", the system awaits availability of another training instance at block 462, and proceeds back to block 458 on the basis of the available training instance. If the decision of block 460 is "yes", the system proceeds to block 464 and ends training of the prediction model (although training of other prediction models can continue). A trained prediction model can be utilized in method 300 or method 500, and can optionally continue to be trained during utilization.

Figure 5:
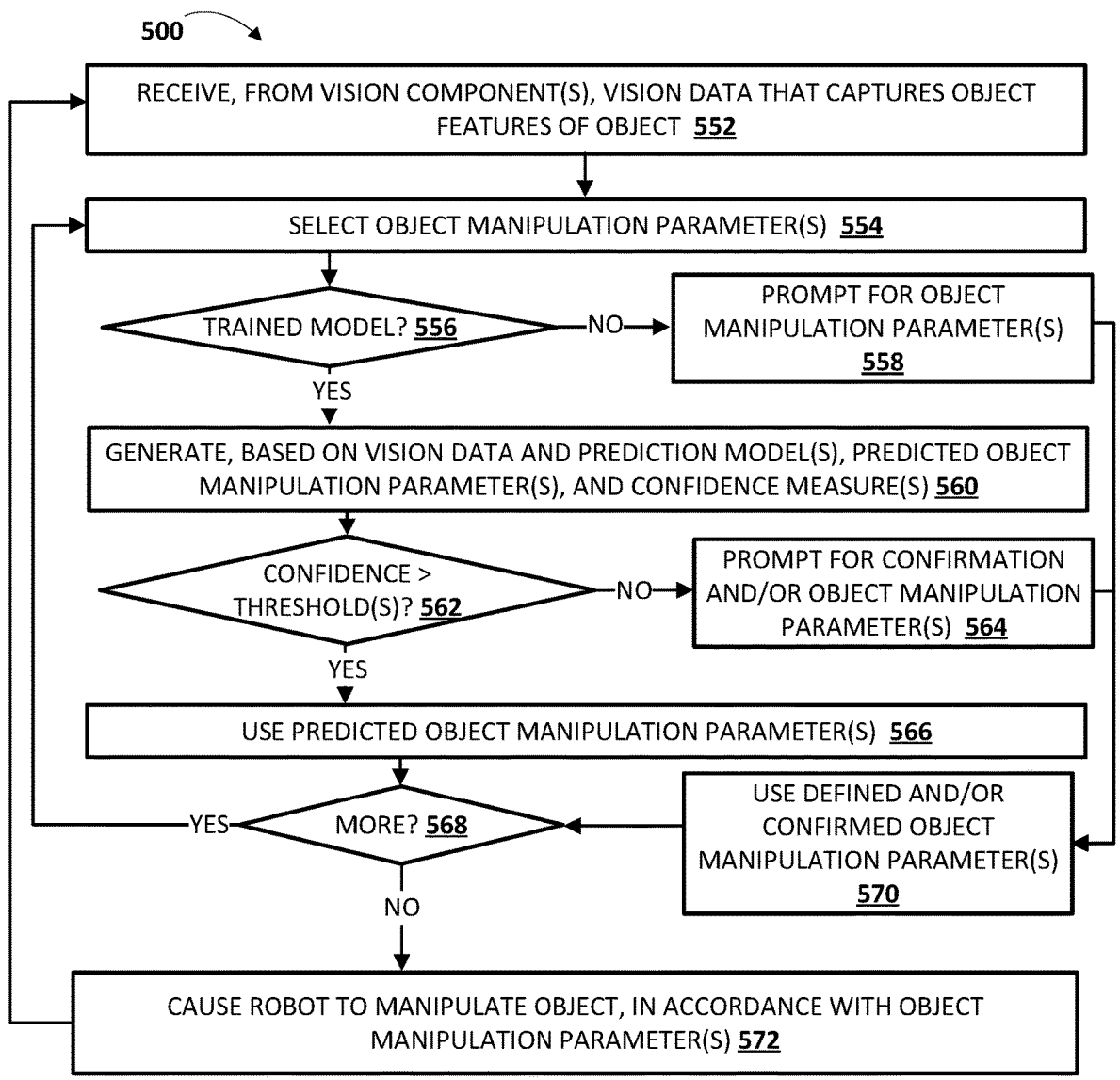
FIG. 5 is a flowchart illustrating an example method of selectively utilizing trained prediction model(s) in determining object manipulation parameter(s) for use by a robot in manipulating objects.

Turning now to FIG. 5, an example method 500 is illustrated of selectively utilizing trained prediction model(s) in determining object manipulation parameter(s) for use by a robot in manipulating objects. Method 500 illustrates some implementations of method 300. For convenience, some of the operations of the method 500 are described with reference to a system that performs the operations. This system may include various components of various computer systems and/or robots, such as one or more components depicted in FIGS. 1A and 1B. Moreover, while operations of the method 500 are shown in a particular order, this is not meant to be limiting. One or more operations may be reordered, omitted or added.

At block 552, the system receives, from one or more vision components, vision data that captures object features of one or more objects. In some implementations or iterations of method 500, the vision components are robotic vision components that view a robot workspace of a corresponding robot and the vision data captures the object features when the object(s) are in the robot workspace. In some other implementations or iterations, the vision components are in a first area of an environment that is disparate from a robot workspace of the environment, and the vision data captures the object features when the object(s) are in the first area—and prior to completion of transporting of the object(s) to the robot workspace. In some of those implementations, one or more of the blocks preceding block 572 can be completed prior to completion of transporting of the object(s) to the robot workspace.

At block 554, the system selects one or more object manipulation parameter(s), of a plurality of object manipulation parameter(s) that need to be resolved for manipulation of an object by a robot.

At block 556, the system determines, for the selected object manipulation parameter(s), whether a trained model for the object manipulation parameter(s) has been brought online as described herein. If not, the system proceeds to block 558 and prompts for the object manipulation parameter(s) to be specified by user interface input(s) at a remote client device. For example, the system can generate a visual representation based on the vision data of block 552, transmit the visual representation to the client device, and, based on block 558, cause a prompt to be rendered, at the client device, for defining the object manipulation parameter(s) via user interface input directed at the visual representation. Any object manipulation parameter(s), defined by user interface input(s) received responsive to the prompt at block 558, can then be used as the selected object manipulation parameters at block 570.

If, at block 556, the system determines, for the selected object manipulation parameter(s), a trained model for the object manipulation parameter(s) has been brought online, the system proceeds to block 560.

At block 560, the system generates, based on vision data of block 552 and prediction model(s), the predicted object manipulation parameter(s) and corresponding confidence measure(s). For example, the system can select prediction model(s) that correspond to the object manipulation parameter(s), and process vision data and/or other data using the prediction model(s), to generate the predicted object manipulation parameter(s) and corresponding confidence measure(s).

The system then proceeds to block 562 and determines whether the confidence measure(s), for the predicted object manipulation parameter(s) satisfy one or more threshold(s) (e.g., 90% or other threshold). If not, the system proceeds to block 564 and prompts for confirmation of the predicted object manipulation parameter(s) at a remote client device and/or prompts for corresponding object manipulation parameter(s) to be specified by user interface input(s) at the remote client device. For example, the system can generate a visual representation that includes an indication of one or more of the predicted object manipulation parameter(s), transmit the visual representation to the client device, and, based on block 564, cause a prompt to be rendered, at the client device. The prompt can solicit the client device operator to confirm the predicted object manipulation parameter(s) via user interface input, or to define corresponding alternate object manipulation parameters via user interface input. Also, for example, the system can additionally or alternatively prompt for one or more of the object manipulation parameter(s) to be specified by user interface input(s) at a remote client device, without presenting the option to confirm the predicted object manipulation parameter(s). In some implementations, if the confidence measure for a given predicted object manipulation parameter does not satisfy the threshold in block 562, but satisfies an additional lower threshold (e.g., 65% or other threshold), the system can cause the prompt for confirmation of the given predicted object manipulation parameter. In those implementations, if the confidence measure of the given predicted object manipulation parameter does not satisfy the additional lower threshold, the system can prompt for a corresponding object manipulation parameter to be defined, optionally without providing any indication of the given predicted object manipulation parameter. Any object manipulation parameter(s), defined by user interface input(s) received responsive to block 564, can then be used as all or part of the selected object manipulation parameters at block 570.

If the system determines, at block 562, that the confidence measure(s) satisfy the threshold(s), the system proceeds to block 566 and uses the predicted object manipulation parameter(s) without prompting for confirmation of the predicted object manipulation parameters.

At block 568, the system then determines whether there are more object manipulation parameter(s) that need to be resolved for the manipulation of the object by the robot. If so, the system proceeds back to block 554 and selects an additional object manipulation parameter. If not, the system proceeds to block 572. It is noted that in an instance of method 500 where the decision at block 556 or block 562 is "no" for more than one iteration of block 556 or block 562, the prompting at the client device can be a single prompt that requests the object manipulation parameters be defined and/or confirmed for all object manipulation parameters where the "no" decision was made at block 556 or block 562. In other words, there won't necessarily be N separate prompts for each of N iterations. Rather, there can optionally be a single prompt that encompasses requests for each of the N iterations.

At block 572, the system causes the robot to manipulate the object in accordance with the object manipulation parameter(s). The object manipulation parameters(s) can include those from one or more iterations of block 566 and/or from one or more iterations of block 570. For example, the object manipulation parameter(s) can include those that are based on predicted object manipulation parameter(s) (with or without confirmation) and/or those that are defined, based on the user interface input(s), independent of any predicted object manipulation parameter(s).

The system then returns to block 552. It is noted that in various implementations multiple iterations of method 500 can be running in parallel for a given environment, enabling visual representations for new object(s) to be generated, transmitted, corresponding data received, and/or corresponding object manipulation parameter(s) determined—prior to completion of method 500 for a previous object (e.g., at least prior to completion of block 572).

Figure 6:
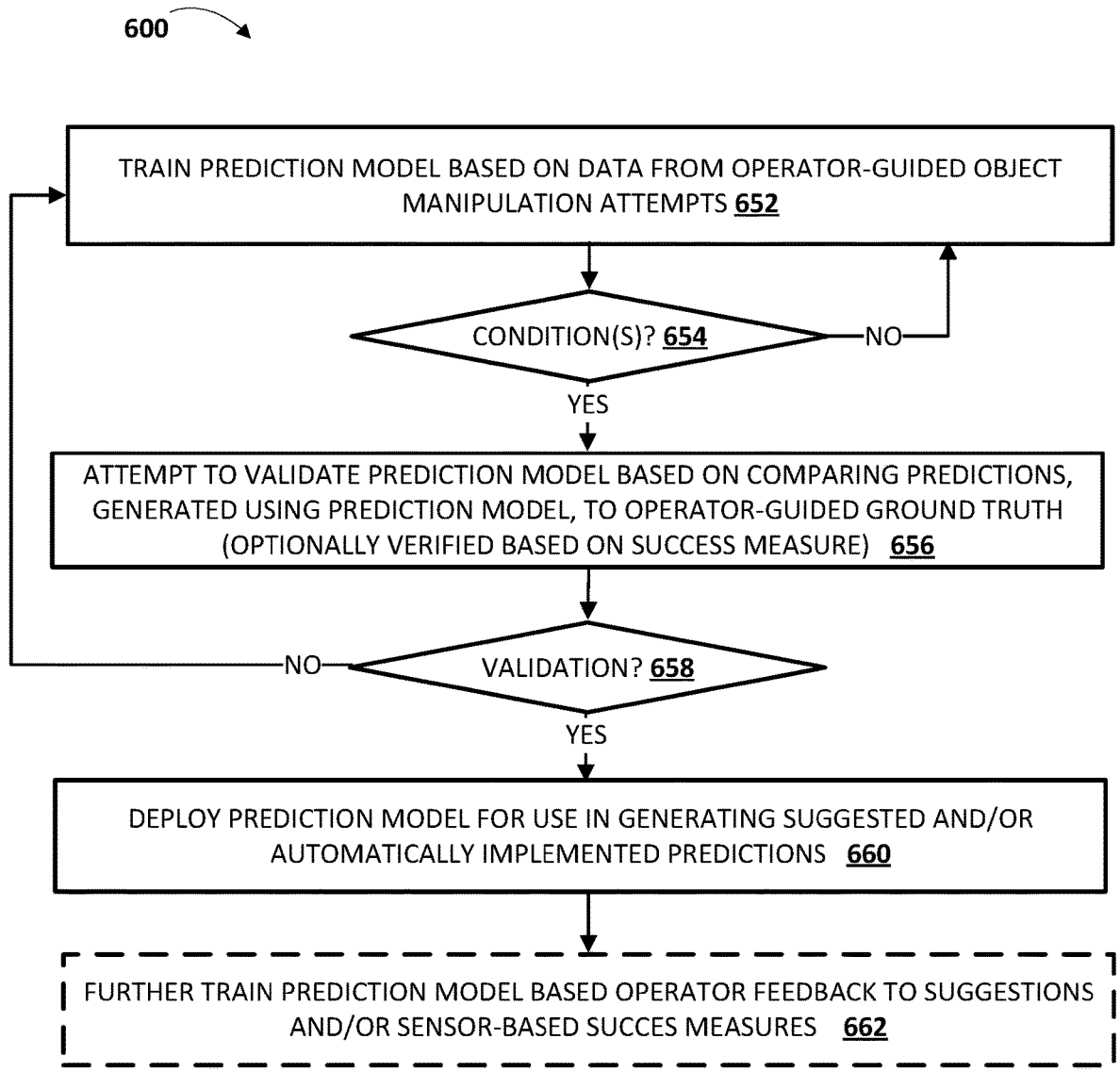
FIG. 6 is a flowchart illustrating an example method of training a prediction model, validating the prediction model, deploying the prediction model, and optionally further training the deployed prediction model.

Turning now to FIG. 6, an example method 600 is illustrated of training a prediction model, validating the prediction model, deploying the prediction model, and optionally further training the deployed prediction model. For convenience, some of the operations of the method 600 are described with reference to a system that performs the operations. This system may include various components of various computer systems and/or robots, such as one or more components depicted in FIGS. 1A and 1B. Moreover, while operations of the method 600 are shown in a particular order, this is not meant to be limiting. One or more operations may be reordered, omitted or added.

At block 652, the system trains a prediction model based on data from operator-guided object manipulation attempts. For example, the system can train the prediction model based on training instances generated in blocks 452, 454, and 456 of method 400.

At block 654, the system determines whether one or more conditions have been satisfied. If not, the system returns to block 652. If so, the system proceeds to block 656. The condition(s) considered at block 654 can include, for example, a threshold quantity of training instances having been utilized in training in block 652 and/or a threshold duration of training at block 652.

At block 656, the system attempts to validate the prediction model based on comparing predictions, generated using the prediction model, to operator-guided ground truth. For example, the system can compare predicted object manipulation parameters, made utilizing the model, to corresponding object manipulation parameters defined based on user interface input(s) (i.e., operator-guided ground truths). The system can determine error measures, for the predictions, based on the comparisons. The operator-guided ground truths can optionally be verified based on determined success measures. In other words, the operator-guided ground truths can be considered ground-truths only if corresponding success measures indicate overall success of the corresponding manipulation and/or success for the portion(s) of the manipulation corresponding to the defined object manipulation parameters.

At block 658, the system determines whether the validation was successful. If not, the system proceeds back to block 652, and optionally adjusts the condition(s) of block 654 (e.g., to require a greater extent of training). In determining whether the validation was successful, various metrics can be utilized. For example, the system can determine a successful validation is at least a threshold percentage of predictions have less than a threshold error measure based on comparisons of block 656.

If the decision at block 658 is that the validation is successful, the system proceeds to block 660. At block 660, the system deploys the prediction model for use in generated suggested and/or automatically implemented predictions. For example, the prediction model can be deployed for use in method 300 and/or method 500.

At optional block 662, the system further trains the prediction model based on operator feedback to suggestions during deployment and/or based on sensor-based success measures during deployment.

Figure 7:
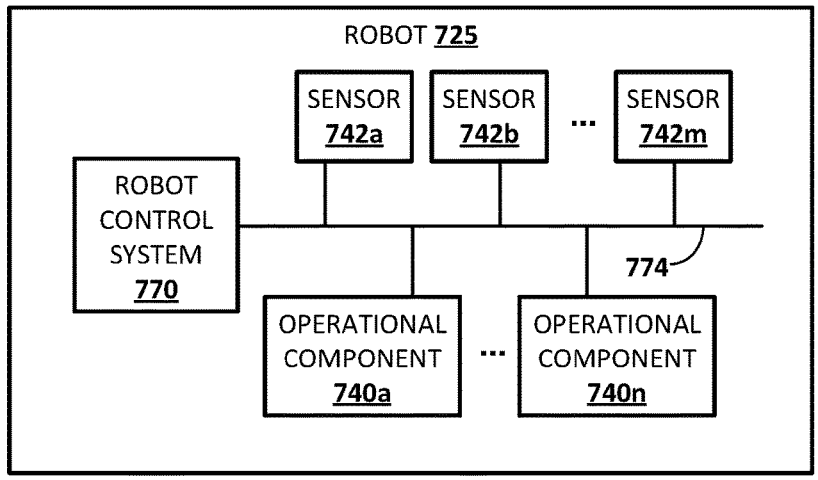
FIG. 7 schematically depicts an example architecture of a robot.

FIG. 7 schematically depicts an example architecture of a robot 725. The robot 725 includes a robot control system 760, one or more operational components 740a-740n, and one or more sensors 742a-742m. The sensors 742a-742m may include, for example, vision components, light sensors, pressure sensors, pressure wave sensors (e.g., microphones), proximity sensors, accelerometers, gyroscopes, thermometers, barometers, and so forth. While sensors 742a-742m are depicted as being integral with robot 725, this is not meant to be limiting. In some implementations, sensors 742a-742m may be located external to robot 725, e.g., as standalone units.

Operational components 740a-740n may include, for example, one or more end effectors and/or one or more servo motors or other actuators to effectuate movement of one or more components of the robot. For example, the robot 725 may have multiple degrees of freedom and each of the actuators may control actuation of the robot 725 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 725. In some implementations, the robot 725 may comprise a "brain box" that may include all or aspects of the control system 760. For example, the brain box may provide real time bursts of data to the operational components 740a-740n, with each of the real time bursts comprising a set of one or more control commands that dictate, inter alio, the parameters of motion (if any) for each of one or more of the operational components 740a-740n. In some implementations, the robot control system 760 may perform one or more aspects of one or more methods described herein.

As described herein, in some implementations all or aspects of the control commands generated by control system 760 can be generated based on objet manipulation parameter(s) generated according to techniques described herein. Although control system 760 is illustrated in FIG. 7 as an integral part of the robot 725, in some implementations, all or aspects of the control system 760 may be implemented in a component that is separate from, but in communication with, robot 725. For example, all or aspects of control system 760 may be implemented on one or more computing devices that are in wired and/or wireless communication with the robot 725, such as computing device 810.

Figure 8:
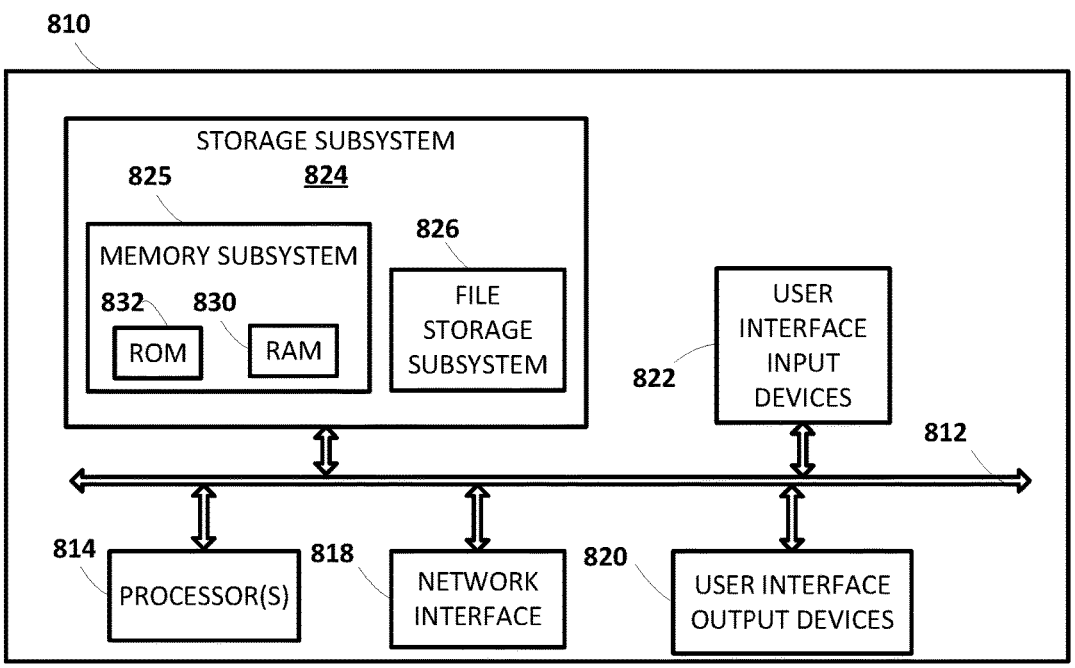
FIG. 8 schematically depicts an example architecture of a computer system.

FIG. 8 is a block diagram of an example computing device 810 that may optionally be utilized to perform one or more aspects of techniques described herein. For example, in some implementations computing device 810 may be utilized to execute simulator 120, sim difference engine 130, real episode system 110, sim training data system 140, and/or training engine 145. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more methods described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In some implementations, a method is provided that includes receiving, from one or more vision components in a first area of an environment, vision data that captures features of the first area at a first time. The captured features include object features of an object that is located in the first area at the first time. The method further includes, prior to completion of transporting of the object from the first area to a disparate robot workspace, of the environment, that is not captured by the vision data: transmitting, via one or more networks to a remote client device, a visual representation that is generated based on the vision data; and receiving, via the one or more networks and from the remote client device, data that is generated based on one or more user interface inputs. The visual representation includes an object representation generated based on the object features. The user interface input(s) are at the remote client device, and are directed at the visual representation when rendered at the remote client device. The method further includes determining, based on the data, one or more object manipulation parameters for manipulating of the object by a robot operating in the robot workspace. The method further includes causing the robot to manipulate the object, in accordance with the one or more object manipulation parameters, responsive to detecting the object is within the robot workspace. The object is within the robot workspace after transporting of the object from the first area to the robot workspace and at a second time that is subsequent to the first time.

These and other implementations of the technology disclosed herein can include one or more of the following features.

In some implementations, determining the one or more object manipulation parameters is also prior to completion of transporting of the object from the first area to the robot workspace.

In some implementations, the one or more object manipulation parameters include a grasp pose for grasping of the object. In those implementations, causing the robot to manipulate the object, in accordance with the one or more object manipulation parameters, responsive to the object being detected within the robot workspace after the transporting includes causing an end effector of the robot to traverse to the grasp pose, and attempt a grasp of the object after traversing to the grasp pose.

In some implementations, the data defines one or more poses and/or one or more points relative to a first reference frame. In some of those implementations, generating the one or more object manipulation parameters includes transforming the one or more poses and/or the one or more points to a robot frame that is disparate from the reference frame, and using the transformed poses and/or points in generating the object manipulation parameters.

In some implementations, the method further includes, subsequent to causing the robot to manipulate the object: determining, based on additional sensor data from one or more additional sensors, a measure of success of the manipulation; generating a positive training instance based on the measure of success satisfying a threshold; and training a machine learning model based on the positive training instance. In some versions of those implementations, the one or more additional sensors include: the robot vision components, a torque sensor of the robot, and/or a weight sensor in the environment. In some additional or alternative versions of those implementations, generating the positive training instance includes: generating training instance input, of the positive training instance, based on the vision data or based on robot vision data from one or more robot vision components of the robot; and/or generating training instance output, of the positive training instance, based on the object manipulation parameters. In some of those additional or alternative versions, the method further includes, subsequent to training the machine learning model based on the positive training instance: processing, using the machine learning model, additional vision data that captures an additional object; generating, based on the processing, one or more predicted object manipulation parameters for the additional object; and causing the robot to manipulate the additional object in accordance with the one or more predicted object manipulation parameters. Additionally, the method can further optionally include: transmitting, to the remote client device or to an additional remote client device, a visual indication of the predicted object manipulation parameters; and receiving, from the remote client device or the additional remote client device, an indication that affirmative user interface input was received responsive to presentation of the visual indication of the predicted object manipulation parameters. Causing the robot to manipulate the additional object in accordance with the one or more predicted object manipulation parameters can be responsive to receiving the indication that affirmative user interface input was received. Optionally, the method further includes generating, based on the processing, a confidence measure for the one or more predicted object manipulation parameters. Transmitting the visual indication of the predicted object manipulation parameters can be responsive to the confidence measure failing to satisfy a threshold confidence measure. Additionally or alternatively, the method can further optionally include, subsequent to training the machine learning model based on the positive training instance: processing, using the machine learning model, additional vision data that captures an additional object; generating, based on the processing, one or more predicted object manipulation parameters for the additional object; transmitting, to the remote client device or to an additional remote client device, a visual indication of the predicted object manipulation parameters; receiving, from the remote client device or the additional remote client device, an indication of alternate object manipulation parameters defined via user interface input received responsive to presentation of the visual indication of the predicted object manipulation parameters; and causing, responsive to receiving the alternate object manipulation parameters, the robot to manipulate the additional object in accordance with the one or more alternate object manipulation parameters. The method can optionally further include further training the machine learning model using a training instance with a labeled output that is based on the alternate object manipulation parameters.

In some implementations, the method further includes, prior to the robot manipulating the object: receiving, from the one or more vision components in the first area, vision data that captures features of the first area at a third time that is after the first time but before the second time, where the vision data includes new object features of a new object that is located in the first area at the third time; transmitting, to the remote client device, a new visual representation that is generated based on the new vision data, the new visual representation including a new object representation generated based on the new object features; receiving, from the remote client device, new data that is generated based on one or more new user interface inputs, at the remote client device, that are directed at the new visual representation when rendered at the remote client device; and determining, based on the data, one or more new object manipulation parameters for manipulating of the new object by a robot operating in the robot workspace. In some of those implementations, the method further includes, subsequent to the robot manipulating the object: causing the robot to manipulate the new object, in accordance with the one or more new object manipulation parameters, responsive to the robot detecting, via the one or more robot vision components, the new object is within the robot workspace. The new object is within the robot workspace after transporting of the new object and at a fourth time that is subsequent to the second time.

In some implementations, the transporting of the object from the first area to the robot workspace is via one or more conveyors.

In some implementations, the method further includes accessing, for each of a plurality of remote client devices, corresponding queue data that defines a quantity and/or duration of outstanding robot manipulation assistant requests. In some of those implementations, the method further includes selecting the remote client device, from the plurality of remote client devices, based on the corresponding query data for the remote client device. Transmitting the visual representation to the remote client device can be responsive to selecting the remote client device.

In some implementations, the object representation is a rendering of the object, wherein the rendering is generated based on the object features and omits one or more features, of the object, that are visible in the vision data.

In some implementations, detecting the object is in the robot workspace is by the robot based on robot vision data from one or more robot vision components of the robot.

In some implementations, a method is provided that includes receiving, from one or more vision components in an environment, vision data that captures features of the environment, including object features of an object that is located in the environment. The method further includes generating, based on processing the vision data using a machine learning model: a predicted object manipulation parameter for the object, and a confidence measure for the predicted object manipulation parameter. The method further includes determining whether the confidence measure, for the predicted object manipulation parameter, satisfies a threshold confidence measure. The method further includes, responsive to determining the confidence measure fails to satisfy the threshold confidence measure: transmitting, via one or more networks to a remote client device: (1) an object representation of the object that is generated based on the object features and (2) a visual indication of the predicted object manipulation parameter; and receiving, via the one or more networks and from the remote client device, data that is generated based on one or more user interface inputs. The user interface input(s) are at the remote client device and are responsive to rendering the object representation and the visual indication at the remote client device. The method further includes determining, based on the data, to utilize either the object manipulation parameter or an alternative object manipulation parameter. The method further includes causing a robot to manipulate the object in accordance with the determined object manipulation parameter or the alternative object manipulation parameter. The method further includes, responsive to determining the confidence measure satisfies the threshold confidence measure: causing the robot to manipulate the object in accordance with the object manipulation parameter, and without transmitting the visual indication to any remote client device for confirmation prior to manipulating the object in accordance with the object manipulation parameter.

These and other implementations of the technology disclosed herein can include one or more of the following features.

In some implementations, the vision components are in a first area of the environment, and determining whether the confidence measure, for the predicted object manipulation parameter, satisfies the threshold confidence measure, occurs prior to transporting of the object to a disparate robot workspace of the robot.

What is claimed is:
1. A method comprising:
   receiving, from one or more vision components in a first area of an environment, vision data that captures features of the first area at a first time, including object features of an object that is located in the first area at the first time;
   accessing, for each of a plurality of remote client devices, corresponding queue data that defines a quantity and/or duration of outstanding robot manipulation assistant requests;
   selecting a remote client device, from the plurality of remote client devices, based on the corresponding query data for the remote client device;
   prior to completion of transporting of the object from the first area to a disparate robot workspace, of the environment, that is not captured by the vision data:
      transmitting, via one or more networks to the remote client device, a visual representation that is generated based on the vision data, wherein the visual representation includes an object representation generated based on the object features, and wherein transmitting the visual representation to the remote client device is responsive to selecting the remote client device, and
      receiving, via the one or more networks and from the remote client device, data that is generated based on one or more user interface inputs, at the remote client device, that are directed at the visual representation when rendered at the remote client device;

determining, based on the data, one or more object manipulation parameters for manipulating of the object by a robot operating in the robot workspace; and causing the robot to manipulate the object, in accordance with the one or more object manipulation parameters, responsive to detecting the object is within the robot workspace, wherein the object is within the robot workspace after transporting of the object from the first area to the robot workspace and at a second time that is subsequent to the first time.

2. The method of claim 1, wherein determining the one or more object manipulation parameters is also prior to completion of transporting of the object from the first area to the robot workspace.

3. The method of claim 1, wherein the one or more object manipulation parameters include a grasp pose for grasping of the object, and wherein causing the robot to manipulate the object, in accordance with the one or more object manipulation parameters, responsive to the object being detected within the robot workspace after the transporting comprises:
  causing an end effector of the robot to traverse to the grasp pose, and attempt a grasp of the object after traversing to the grasp pose.

4. The method of claim 1, wherein the data defines one or more poses and/or one or more points relative to a first reference frame, and wherein generating the one or more object manipulation parameters comprises:
  transforming the one or more poses and/or the one or more points to a robot frame that is disparate from the reference frame; and
  using the transformed poses and/or points in generating the object manipulation parameters.

5. The method of claim 1, further comprising:
  subsequent to causing the robot to manipulate the object:
    determining, based on additional sensor data from one or more additional sensors, a measure of success of the manipulation;
    generating a positive training instance based on the measure of success satisfying a threshold; and
    training a machine learning model based on the positive training instance.

6. The method of claim 5, wherein the one or more additional sensors include: the robot vision components, a torque sensor of the robot, or a weight sensor in the environment.

7. The method of claim 5, wherein generating the positive training instance comprises generating training instance input, of the positive training instance, based on the vision data or based on robot vision data from one or more robot vision components of the robot.

8. The method of claim 7, wherein generating the positive training instance comprises generating training instance output, of the positive training instance, based on the object manipulation parameters.

9. The method of claim 8, further comprising:
  subsequent to training the machine learning model based on the positive training instance, further comprising:
    processing, using the machine learning model, additional vision data that captures an additional object;
    generating, based on the processing, one or more predicted object manipulation parameters for the additional object; and
    causing the robot to manipulate the additional object in accordance with the one or more predicted object manipulation parameters.

10. The method of claim 9, further comprising:
  transmitting, to the remote client device or to an additional remote client device, a visual indication of the predicted object manipulation parameters;
  receiving, from the remote client device or the additional remote client device, an indication that affirmative user interface input was received responsive to presentation of the visual indication of the predicted object manipulation parameters;
  wherein causing the robot to manipulate the additional object in accordance with the one or more predicted object manipulation parameters is responsive to receiving the indication that affirmative user interface input was received.

11. The method of claim 10, further comprising:
  generating, based on the processing, a confidence measure for the one or more predicted object manipulation parameters;
  wherein transmitting the visual indication of the predicted object manipulation parameters is responsive to the confidence measure failing to satisfy a threshold confidence measure.

12. The method of claim 8, further comprising:
  subsequent to training the machine learning model based on the positive training instance, further comprising:
    processing, using the machine learning model, additional vision data that captures an additional object;
    generating, based on the processing, one or more predicted object manipulation parameters for the additional object;
    transmitting, to the remote client device or to an additional remote client device, a visual indication of the predicted object manipulation parameters;
    receiving, from the remote client device or the additional remote client device, an indication of alternate object manipulation parameters defined via user interface input received responsive to presentation of the visual indication of the predicted object manipulation parameters; and
    causing, responsive to receiving the alternate object manipulation parameters, the robot to manipulate the additional object in accordance with the one or more alternate object manipulation parameters.

13. The method of claim 12, further comprising:
  further training the machine learning model using a training instance with a labeled output that is based on the alternate object manipulation parameters.

14. The method of claim 1, further comprising, prior to the robot manipulating the object:
  receiving, from the one or more vision components in the first area, vision data that captures features of the first area at a third time that is after the first time but before the second time, wherein the vision data includes new object features of a new object that is located in the first area at the third time;
  transmitting, to the remote client device, a new visual representation that is generated based on the new vision data, the new visual representation including a new object representation generated based on the new object features;
  receiving, from the remote client device, new data that is generated based on one or more new user interface inputs, at the remote client device, that are directed at the new visual representation when rendered at the remote client device; and determining, based on the data, one or more new object manipulation parameters for manipulating of the new object by a robot operating in the robot workspace.

15. The method of claim 14, further comprising, subsequent to the robot manipulating the object:

causing the robot to manipulate the new object, in accordance with the one or more new object manipulation parameters, responsive to the robot detecting, via the one or more robot vision components, the new object is within the robot workspace, wherein the new object is within the robot workspace after transporting of the new object and at a fourth time that is subsequent to the second time.

16. The method of claim 1, wherein the transporting of the object from the first area to the robot workspace is via one or more conveyors.

17. The method of claim 1, wherein the object representation is a rendering of the object, wherein the rendering is generated based on the object features and omits one or more features, of the object, that are visible in the vision data.

18. The method of claim 1, wherein detecting the object is in the robot workspace is by the robot based on robot vision data from one or more robot vision components of the robot.

19. A method comprising:

receiving, from one or more vision components in a first area of an environment, vision data that captures features of the first area at a first time, including object features of an object that is located in the first area at the first time;

prior to completion of transporting of the object from the first area to a disparate robot workspace, of the environment, that is not captured by the vision data:

transmitting, via one or more networks to a remote client device, a visual representation that is generated based on the vision data, the visual representation including an object representation generated based on the object features, and receiving, via the one or more networks and from the remote client device, data that is generated based on one or more user interface inputs, at the remote client device, that are directed at the visual representation when rendered at the remote client device;

determining, based on the data, one or more object manipulation parameters for manipulating of the object by a robot operating in the robot workspace;

causing the robot to manipulate the object, in accordance with the one or more object manipulation parameters, responsive to detecting the object is within the robot workspace, wherein the object is within the robot workspace after transporting of the object from the first area to the robot workspace and at a second time that is subsequent to the first time; and prior to the robot manipulating the object:

receiving, from the one or more vision components in the first area, vision data that captures features of the first area at a third time that is after the first time but before the second time, wherein the vision data includes new object features of a new object that is located in the first area at the third time;

transmitting, to the remote client device, a new visual representation that is generated based on the new vision data, the new visual representation including a new object representation generated based on the new object features;

receiving, from the remote client device, new data that is generated based on one or more new user interface inputs, at the remote client device, that are directed at the new visual representation when rendered at the remote client device;

and determining, based on the new data, one or more new object manipulation parameters for manipulating of the new object by a robot operating in the robot workspace.

20. The method of claim 19, further comprising, subsequent to the robot manipulating the object:

causing the robot to manipulate the new object, in accordance with the one or more new object manipulation parameters, responsive to the robot detecting, via the one or more robot vision components, the new object is within the robot workspace, wherein the new object is within the robot workspace after transporting of the new object and at a fourth time that is subsequent to the second time.

21. The method of claim 19, further comprising:

subsequent to causing the robot to manipulate the object:

determining, based on additional sensor data from one or more additional sensors, a measure of success of the manipulation;

generating a positive training instance based on the measure of success satisfying a threshold; and training a machine learning model based on the positive training instance.

* * * * *